US012701426B2

(12) United States Patent
Bhatnagar et al.

(10) Patent No.: US 12,701,426 B2
(45) Date of Patent: Aug. 4, 2026

(54) SYSTEM AND METHOD FOR FACILITATING TRACKING AREA CODE FOR INDOOR AND OUTDOOR SITES

(71) Applicant: JIO PLATFORMS LIMITED, Ahmedabad (IN)

(72) Inventors: Aayush Bhatnagar, Maharashtra (IN); Haresh Ambaliya, Maharashtra (IN); Vikram Singh, Maharashtra (IN); Himanshu Patel, Maharashtra (IN); Manish Patel, Madhya Pradesh (IN); Arunima Sarkar, Maharashtra (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 497 days.

(21) Appl. No.: 18/246,461

(22) PCT Filed: May 31, 2022

(86) PCT No.: PCT/IB2022/055075
§ 371 (c)(1),
(2) Date: Mar. 23, 2023

(87) PCT Pub. No.: WO2022/254326
PCT Pub. Date: Dec. 8, 2022

(65) Prior Publication Data
US 2024/0056830 A1 Feb. 15, 2024

(30) Foreign Application Priority Data
May 31, 2021 (IN) .............................. 202121024285

(51) Int. Cl.
*H04W 16/18* (2009.01)
*H04W 24/10* (2009.01)

(52) U.S. Cl.
CPC ........... *H04W 16/18* (2013.01); *H04W 24/10* (2013.01)

(58) Field of Classification Search
None
See application file for complete search history.

(56) References Cited

U.S. PATENT DOCUMENTS 10,645,533 B1 * 5/2020 Winter ................... H04W 24/02
2011/0235574 A1 * 9/2011 DaSilva ................ H04W 16/02
370/328

(Continued)

FOREIGN PATENT DOCUMENTS

CN 106604214 A 4/2017
CN 108696877 A 10/2018

OTHER PUBLICATIONS

International Search Report from International Appl. No. PCT/IB2022/055075, mailed Nov. 8, 2022.

*Primary Examiner* — Adolf Dsouza
(74) *Attorney, Agent, or Firm* — FINNEGAN, HENDERSON, FARABOW, GARRETT & DUNNER LLP

(57) ABSTRACT

The present disclosure provides a system and method for facilitating tracking area code (TAC) engine to prepare dynamic network polygons based on actual configuration, allocation of TAC to new cell sites, identification of various discrepancies and anomalies in existing planned network, capacity optimization through TAC Division, merge and network polygon edit, and auto work order generation and execution of changes in respective systems, MME Pool and eNB/SCs. Tracking Area Code is a vital parameter for new sites planning and rollout. The method complements network rollout speed with highest level of accuracy of planning and better network perform nave and accuracy. Auto planning engine makes TAC planning zero touch engine (Continued)

with manual review and action through manual edit, audit and work order creation features. Auto planning and configuration help faster rollout, speedy correction and implementation in live network to enhance network performance and user experience.

12 Claims, 25 Drawing Sheets

(56)                 References Cited

U.S. PATENT DOCUMENTS

| | | | |
|---|---|---|---|
| 2019/0182804 A1 | 6/2019 | Agarwal et al. | |
| 2020/0228929 A1* | 7/2020 | Winter | H04W 60/00 |
| 2021/0144669 A1* | 5/2021 | Edge | H04W 12/037 |
| 2021/0321357 A1* | 10/2021 | Shrestha | H04W 68/005 |

* cited by examiner

SYSTEM AND METHOD FOR FACILITATING TRACKING AREA CODE FOR INDOOR AND OUTDOOR SITES

RESERVATION OF RIGHTS

A portion of the disclosure of this patent document contains material which is subject to intellectual property rights such as, but are not limited to, copyright, design, trademark, IC layout design, and/or trade dress protection, belonging to Jio Platforms Limited (JPL) or its affiliates (hereinafter referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner. The patent document includes systems and methods as defined in 3GPP Technical Specification (TS) 23.003 and the like.

TECHNICAL FIELD

The present disclosure relates to a wireless communications technology and in particular to designing dynamic network polygons based on actual configuration and planning new network elements.

BACKGROUND

Tracking area code (TAC) is used in Long Term Evolution (LTE) in wireless communications technology. New developed feature will be used for allocation of TAC to new sites. TAC is used in locating user equipment (users) in a network for uniformly distributing the paging load. Better TAC planning will lead to increased accuracy and efficiency of network planning which will help to increase customer experience. Dynamic TAC Polygons are being created based on actual configurations of each eNodeB.

In current practice TAC code is managed manually by different circle engineers in terms of polygon and database management. During planning phase, engineer needs to refer many different manual databases, which leads to more time consumption. This manual effort also leads to a lot of inaccuracy and inefficiency along with huge loss of man power. Even with automation, accuracy of TAC ID allocation has to be increased with run time calculation of TAC utilization, and other entities such as district boundary, outdoor and indoor TAC ID. With help of auto allocation trigger of TAC division to offload overloaded Polygon is possible on run time. Synchronizations between different teams for database is a major issue in existing eNodeB configurations which cause discrepancy. In case of overutilization of any TAC, circle teams need to manually divide the TAC Polygon with the help of other planning tools.

Hence there is a need in the art, to provide for a method for a speedy, accurate and efficient TAC planning to support massive new site rollout.

OBJECTS OF THE PRESENT DISCLOSURE

It is an object of the present disclosure to provide for a system and a method for creation of auto polygon.

It is an object of the present disclosure to provide for a system and a method for auto allocation of TAC ID to new planned sites based on location, polygons and certain parameters.

It is an object of the present disclosure to provide for a system and a method for including certain KPI/Parameters such as TAC utilizations, Number of sites per polygon, administration boundaries such as district, States, etc but not limited to parameters mentioned in this document we can include other network KPIs/Parameters as per need.

It is an object of the present disclosure to provide for a system and a method for identifying discrepancies such as TAC ID discrepancy, District boundary discrepancy, TAC-Island discrepancy and ISC TAC Nomenclature discrepancy.

It is an object of the present disclosure to provide for a system and a method for facilitating report generation and auto E-Mail to concern teams.

It is an object of the present disclosure to provide for a system and a method for facilitating TAC Division action based on Geography and Site counts.

It is an object of the present disclosure to provide for a system and a method for merging TAC action to be used to optimize the network KPIs.

It is an object of the present disclosure to provide for a system and a method for preparation of pre and post-Division/merge plan to be implemented in OSS.

It is an object of the present disclosure to provide for a system and a method for auto generation of work orders.

It is an object of the present disclosure to provide for a system and a method for facilitating basic admin settings and planned data implementation in respective systems.

SUMMARY OF THE INVENTION

Aspects of the present disclosure relate to wireless communications technology and in particular to designing dynamic network polygons based on actual configuration.

In an aspect, a system for creating dynamic Tracking Area Code (TAC) polygons in a network in a given geographical site is disclosed, the system comprising: a processor (202); a memory (204) coupled to the processor (202), wherein the memory (204) comprises processor-executable instructions, which on execution causes the processor (202) to: receive, from one or more network nodes, a set of data packets, each of the said set of data packets corresponding to a TAC; distribute the received set of data packets to a plurality of On-Air sites within the network; fetch, by a data acquisition engine, a configuration data of the one or more network nodes by retrieving a configuration management (CM) file from the one or more network nodes; parse, from the CM file, a TAC ID for each of the one or more network nodes and store the TAC ID in a master database; create, by a TAC Controller, on execution of a first set of executable instructions are Voronoi algorithm. And a TAC polygon based on the configuration data extracted from the CM file and clustering machine learning algorithm.

In an embodiment, the TAC Controller is further configured to: fetch from the master database on an operational support system (OSS), a district boundary and a circle boundary; clip, the created TAC polygon at the district boundary and the circle boundary; display the clipped TAC polygons on a display by superimposing the TAC polygons on a map; generate a report of the TAC polygons by a report generating engine.

In an embodiment, the TAC Controller is further configured to: identify a site within the TAC polygon and obtain the TAC ID for the site; fetch from the master database, the TAC ID, the district boundary and the circle boundary associated with the site; compare the TAC ID obtained from the master database with the TAC ID of the polygon within which the site falls; on mismatch between the TAC ID obtained from the master database and the TAC ID of the polygon within which the site falls, determine a discrepancy in the TAC polygons.

In an embodiment, a TAC polygon edit engine within the TAC Controller is configured to: select at least a first TAC polygon and a second TAC polygon from the created TAC polygons for editing; select the site to be shifted from the first TAC polygon to the second TAC polygon; generate a work order to freeze the first and second TAC polygons with the site being shifted to be covered under the second TAC polygon; prepare the operating support system's configuration plan for shift from the first TAC polygon to the second TAC polygon.

In an embodiment, the TAC polygon edit engine is further configured to: select at least a third TAC polygon and a fourth TAC polygon to be merged; check by a TAC merge logic engine a utilization of the TAC post-merger; on receipt of an overload threshold indication on checking, send an overload threshold message to a user; on the utilization value being below threshold on checking, retain the TAC ID corresponding to the third TAC polygon for post merge single TAC ID; prepare by the TAC merge logic engine a MME and RAN OSS configuration based on the merge; generate a work order to freeze the third and fourth TAC polygons with the TAC ID of the third TAC polygon; prepare the operating support system's configuration plan for shift from the first TAC polygon to the second TAC polygon.

In an aspect, a method for creating a dynamic Tracking Area Code polygon in a network is disclosed. The method comprises receiving, from one or more network nodes, a set of data packets, each of the said set of data packets corresponding to a TAC; distributing the received set of data packets to a plurality of on-AIR sites within the network; fetching, by a data acquisition engine, a configuration of the one or more network nodes by retrieving a configuration management (CM) file from the one or more network nodes; parsing, from the CM file, a TAC ID for each of the one or more network nodes and storing the TAC ID in a master database; creating, by a TAC Controller, on executing a Voronoi algorithm, a TAC polygon based on the configuration data extracted from the CM file; clustering the network nodes through machine learning clustering based on common TAC ID within each telecom circle comprising outdoor plotting of one or more network nodes and individual cells; fetching a district boundary and a circle boundary from respective boundary engine; and clipping the TAC polygon at the district boundary and the circle boundary.

In an embodiment, the method further comprises: searching a latitude/longitude for a SITE ID on receiving a TAC polygon to identify a site; locating the site based on searched latitude/longitude; identifying the created TAC polygon associated with the located site; checking, by the TAC allocation business logic block for a business logic condition to allocate the TAC ID to the site; allocating polygon TAC ID to the site on fulfilment of the business logic condition; updating the polygon TAC ID assigned to the site on the master database by a database update engine; sending a TAC allocation result for the site through a message.

In an embodiment, the method, when implemented by a TAC allocation tool includes: searching a SITE ID by fetching a latitude/longitude from the master database for respective SAP ID; dragging and dropping the SITE ID for macro cell and selecting Call ID for individual cell for site allocations; generating a TAC engine; sending a TAC allocation result for respective sites through a message.

In an embodiment, indoor new TAC ID generation comprises: searching a latitude/longitude of the site and locating latitude/longitude on which the site falls; on an indoor Tracking Area being available for TAC ID, calculating distance from all nearby indoor TACs; identifying the nearest TAC based on a distance from the site; checking a utilization of the TAC on-AIR and on utilization being within limit, allocating TAC and updating the allocation data in the master database; on utilization not being within limit, checking for another TAC available within excluding the TAC checked earlier to identify the nearest TAC excluding the TAC checked earlier.

In an embodiment, discrepancy identification comprises: identifying the site within the TAC polygon and obtaining the TAC ID for the site; fetching the TAC ID, the district boundary and the circle boundary associated with the site from the master database; comparing the TAC ID obtained from the master database with the TAC ID of the polygon within which the site falls; on mismatch between the TAC ID obtained from the master database and the TAC ID of the polygon within which the site falls, determining a discrepancy in the TAC polygons.

In an embodiment, the method further comprised polygon division based on utilization of polygon, utilization can be calculated by number of sites, paging success, other network KPI and not limited to mention parameters. On over utilization polygon division engine scan entire polygon and divide in two parts in such a way to have equal area and site division in each polygon. Generate a work order to freeze the both TAC polygons with the TAC ID of the newly created TAC polygon; prepare the operating support system's configuration plan for shift from the old TAC polygon to the newly created TAC polygon.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

The diagrams are for illustration only, which thus is not a limitation of the present disclosure, and wherein:

FIG. 15 illustrates an exemplary representation of TAC audit and report (1500), in accordance with an embodiment of the present disclosure.

FIGS. 32-33 illustrate exemplary illustrations representing TAC settings in accordance with an embodiment of the present disclosure.

DETAILED DESCRIPTION

Figure 1:
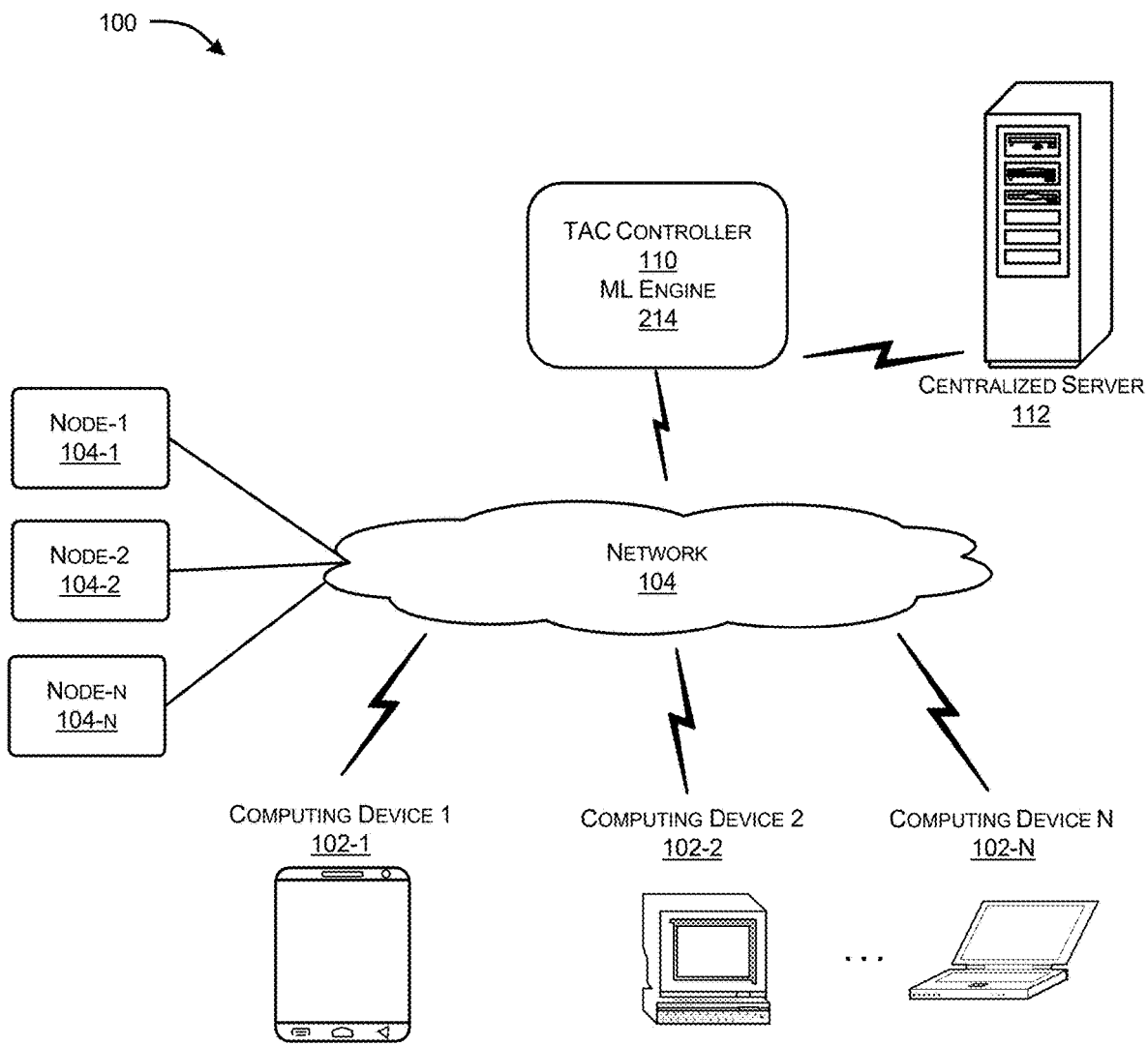
FIG. 1 illustrates exemplary architecture (100) in which or with which proposed system may be implemented, in accordance with an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

The present disclosure relates to a wireless communications technology and in particular to designing dynamic network polygons based on actual configuration.

The term "eNodeB or Evolved Node B" is the element in E-UTRA of LTE which manages: radio resource management, radio bearer control, radio admission control connectivity, mobility management, resource handling between UE's and eNB radios, header compression, link encryption of the user data stream, packet routing of user data towards its destination (usually to the EPC or other eNB's), scheduling and transmitting paging messages (incoming calls and connection request), broadcast information (system information) and measurement reporting to assist in handover decisions.

The term "small cells" for outdoor or indoor has the same functionality as that of eNodeB. They are primarily used for capacity addition as hotspots. The term "Mobility Management Entity (MME)" plays an important role in LTE EPC (Evolved Packet Core) architecture. MME is the main signaling node in EPC. The main functions of MME are: network access control where MME manages authentication and authorization for the UE. It also facilitates UE access to the network to gain IP connectivity. Another function of MME is radio resource management wherein MME works with the HSS and the RAN to decide the appropriate radio resource management strategy (RRM) that can be UE-specific. Yet another function of MME is mobility management which is one of the most complex functions MME performs. Providing seamless inter-working has multiple use cases such as Inter-eNB and Inter-RAT, are many other functions among others. The use cases become more complex depending on a change in MME, S-GW, P-GW or inter-working across other wireless networks, Roaming Management: MME supports outbound and inbound roaming subscribers from other LTE/EPC systems and legacy networks, UE Reachability: MME manages communication with the UE and HSS to provide UE reachability and activity-related information, Tracking Area Management: Allocates and reallocates a tracking area identity list to the UE, Lawful Intercept: Since MME manages the control plane of the network, MME can provide the whereabouts of a UE to a law enforcement monitoring facility. Load Balancing Between S-GWs: Directs UEs entering an S-GW pool area to an appropriate S-GW. This achieves load balancing between S-GWs.

The term "LTE System Management Core (CORE OSS)" relates to a management scheme that connects all the EPC entities such as MME, PGW, SGW which helps for remote login to all the EPC nodes (Samsung). The main function of CORE OSS are: remote login, performance management, configuration management, fault management, call data records. The term "LTE System Management Radio (OSS)" relates to all the radio entities such as eNodeB's and small cells which helps for remote login to all the radio nodes. The main function of OSS are: remote login, performance management, configuration management, fault management. The term "Small Cell OSS" is similar to OSS which connects all the radio entities but specifically of any ODM small cells only. The main function of Small Cell OSS Small Cell OSS are: remote login, performance management, configuration management, fault management.

This invention utilizes tracking area code (TAC) engine to prepare dynamic network polygons based on actual configuration, allocation of TAC to new cell sites, identification of various discrepancies and anomalies in existing planned network, capacity optimization through TAC Division, merge and network polygon edit, and auto work order generation and execution of changes in respective systems, MME Pool and eNB/SCs.

FIG. 1 illustrates exemplary architecture (100) in which or with which proposed system may be implemented, in accordance with an embodiment of the present disclosure. The example computing system (100) shown in FIG. 1 includes one or more computing devices (102-1, 102-2 . . . 102-N) (also referred collectively computing devices (102) and individually as computing device (102) or also referred to as user equipment (UE 102) when associated with a user) communicatively coupled to a wireless network (106) and a plurality of nodes (104-1, 104-2 . . . 104-N). A computing system (100) may include additional or different features, and the components of a computing system may operate as described with respect to FIG. 1 or in another manner. The computing devices (102) shown in FIG. 1 may further include a centralised server (112), a TAC system (110) associated with a machine learning engine (214) (From FIG. 2). In an exemplary embodiment, the plurality of nodes can be any or a combination of EnodeBs and small cells but not limited to the like.

In an embodiment, the TAC system (110) (interchangeably referred to as RAN intelligent controller unit) associated with the quantum processor unit/processor unit (108) may receive from the one or more computing device (102) a set of data packets, each data packet corresponding to a microservice. The ML engine (214) may cause the TAC system (110) to run an executable first set of instructions associated with user equipment (UE). Based on the first set of instructions, the TAC system (110) may distribute the set of data packets to the plurality of nodes (104) associated with the UE (102).

In an embodiment, the first set of executable instructions (interchangeably referred to as Voronoi algorithm) may be executed on the one or more computing devices (102) to track a UE (102). The first set of executable instructions may include the steps of creating TAC polygon, allocating TAC ID to the one or more computing devices (102) and identifying discrepancies between one or more TAC ID allocated computing devices. A report generating engine may generate the reports automatically on a single click by a user. The first set of executable instructions further include the steps of TAC Audit and Report, Auto E-Mail to respective Stockholders, TAC Division, Merge and Edit actions, Work order generations, Work order executions, Algorithm Control Parameters, Admin control for Core Network (MME Pool Architecture definitions).

Figure 2:
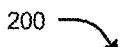
FIG. 2 illustrates an exemplary representation (200) of a computing device (102) for TAC planning of executable set of instructions, in accordance with an embodiment of the present disclosure.
Figure 2:
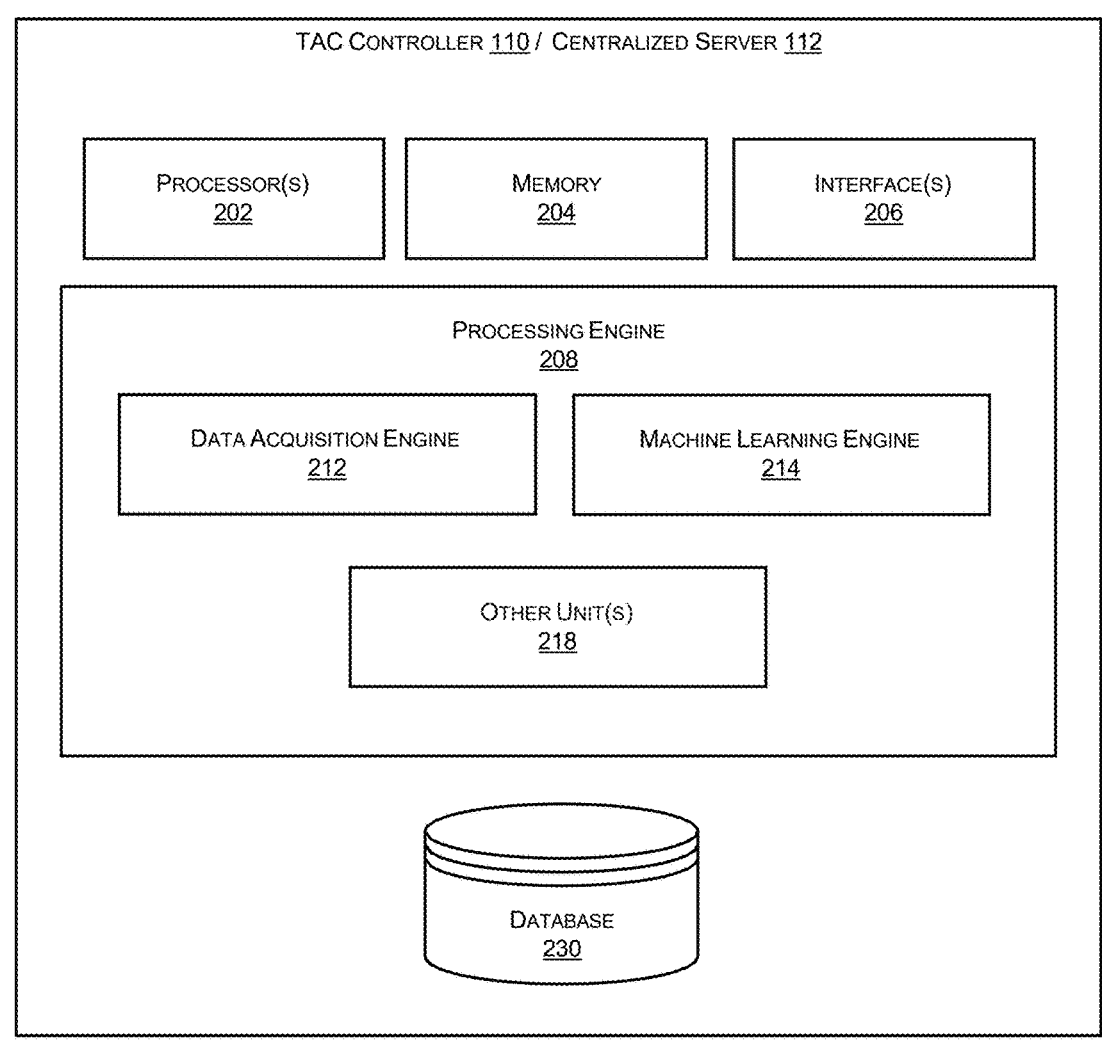

FIG. 2 illustrates an exemplary representation (200) of a TAC system (110), in accordance with an embodiment of the present disclosure. As illustrated the TAC system (110) may include one or more processors (202) may be implemented as one or more microprocessors, microcomputers, microcontrollers, digital signal processors, central processing units, logic circuitries, and/or any devices that manipulate data based on operational instructions. Among other capabilities, the one or more processor(s) (202) may be configured to fetch and execute computer-readable instructions stored in a memory (204) of the computing device (104). The memory (204) may store one or more computer-readable instructions or routines, which may be fetched and executed to create or share the data units over a network service. The memory (204) may comprise any non-transitory storage device including, for example, volatile memory such as RAM, or non-volatile memory such as EPROM, flash memory, and the like.

The TAC system (110) may also comprise an interface(s) (206). The interface(s) (206) may comprise a variety of interfaces, for example, interfaces for data input and output devices, referred to as I/O devices, storage devices, SCADA, Sensors and the like. The interface(s) (206) may facilitate communication of the computing device (102) with various devices coupled to it. The interface(s) (206) may also provide a communication pathway for one or more components of the computing device (102). Examples of such components include, but are not limited to, quantum processing engine(s) (202) and database (230).

The one or more processors (202) may be implemented as a combination of hardware and programming (for example, programmable instructions) to implement one or more functionalities of the one or more processors (202). In examples described herein, such combinations of hardware and programming may be implemented in several different ways. For example, the programming for the one or more processors (202) may be processor executable instructions stored on a non-transitory machine-readable storage medium and the hardware for the one or more processors (202) may comprise a processing resource (for example, one or more processors), to execute such instructions. In the present examples, the machine-readable storage medium may store instructions that, when executed by the processing resource, implement the one or more processors (202). In such examples, the RAN controller unit (110) may comprise the machine-readable storage medium storing the instructions and the processing resource to execute the instructions, or the machine-readable storage medium may be separate but accessible to the TAC system (110) and the processing resource. In other examples, the one or more processors (202) may be implemented by electronic circuitry. In an aspect, the database (230) may comprise data that may be either stored or generated as a result of functionalities implemented by any of the components of the processor (202) or the processing engines (208).

In an exemplary embodiment, the processing engine(s) (208) of the TAC system (110) may include, data acquisition engine (212), machine learning (ML) engine (214) and other engines (216) wherein the other engines (216) may further include, without limitation, storage engine, computing engine, or signal generation engine. The computing device (102) can be implemented using any or a combination of hardware components and software components.

Figure 3:
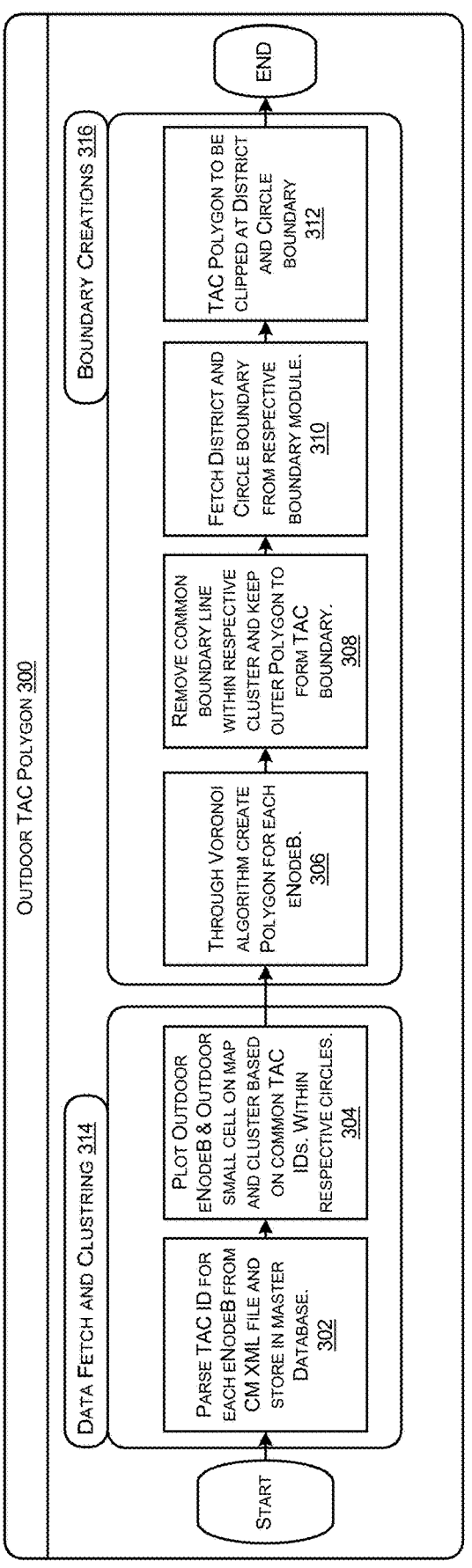
FIG. 3 illustrates exemplary flow diagram of a TAC polygon creation method, in accordance with an embodiment of the present disclosure.

FIG. 3 illustrates exemplary flow diagram of a TAC polygon creation method, in accordance with an embodiment of the present disclosure.

Figure 4:
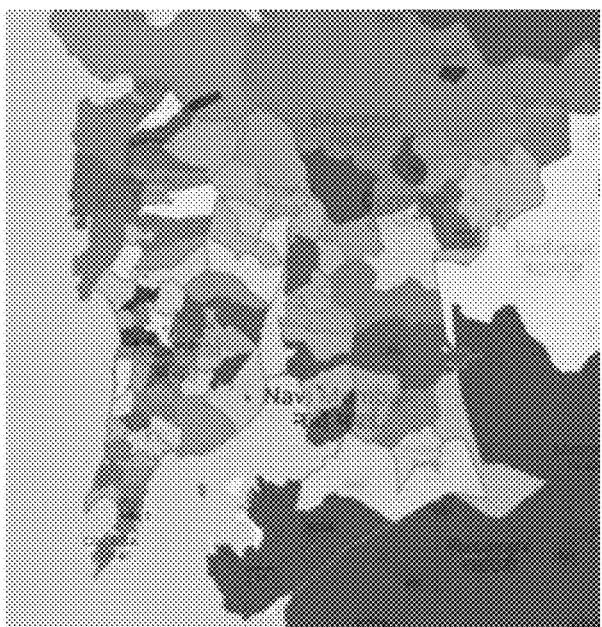
FIG. 4 illustrates exemplary illustration of an outdoor TAC polygon, in accordance with an embodiment of the present disclosure.

As illustrated, the TAC Polygon creation method may include at block 314 data fetching and clustering by the step 302 of fetching on-air eNodeB existing configuration through a CM file and parsing and storing a TAC ID for an individual cells or eNodeB in a database for individual eNodeB and at step 304 clustering eNodeB through machine learning clustering algorithm based on common TAC ID within each telecom circles comprising outdoor plotting of the eNodeBs and the small cells. The method (300) further includes the step of executing the Voronoi algorithm for each site of the respective eNode B or small cell to prepare polygon of each site and at step 306 deleting common polygon lines between eNodeB of same TAC ID cluster b to get outer polygon of individual TAC. At step 308, fetching district and circle boundary from respective boundary engine at block 316 and at step 310, clipping TAC polygon at District and circle boundary. FIG. 4 illustrates exemplary illustration of an outdoor TAC polygon, in accordance with an embodiment of the present disclosure.

Figure 5:
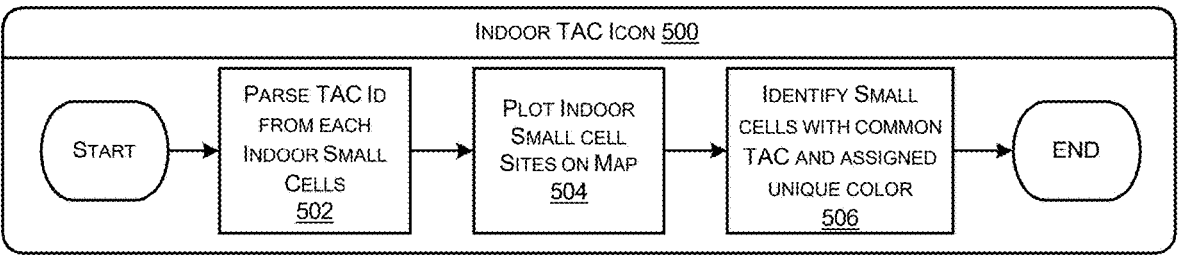
FIG. 5 illustrates exemplary flow diagram of an indoor TAC icon (500) generation, in accordance with an embodiment of the present disclosure.
Figure 6:
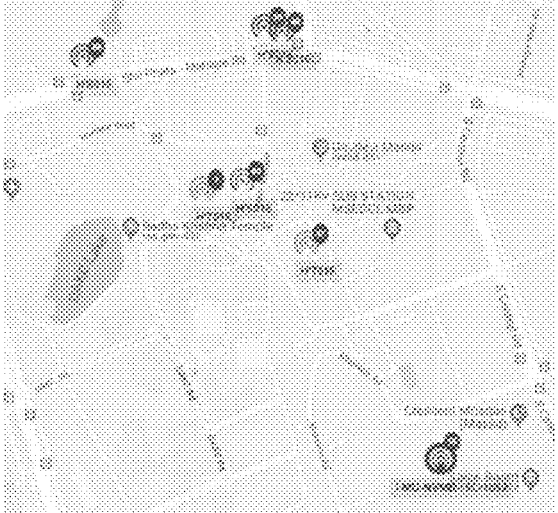
FIG. 6 illustrates exemplary illustration of an outdoor TAC polyindoor TAC Icon Visualizations, in accordance with an embodiment of the present disclosure.

FIG. 5 illustrates exemplary flow diagram of an indoor TAC icon (500) generation, in accordance with an embodiment of the present disclosure. As illustrated in FIG. 5, TAC ID Allocation for indoor site is shown here. During planning and implementation of new sites, the method may include at step 502, parsing RF parameters which include TAC ID of each indoor small cell, at step 504 plotting indoor small cell sites on map and at step 506 identifying small cells with common TAC and assigning unique color. FIG. 6 illustrates exemplary illustration of an outdoor TAC poly indoor TAC Icon Visualizations, in accordance with an embodiment of the present disclosure.

Figure 7:
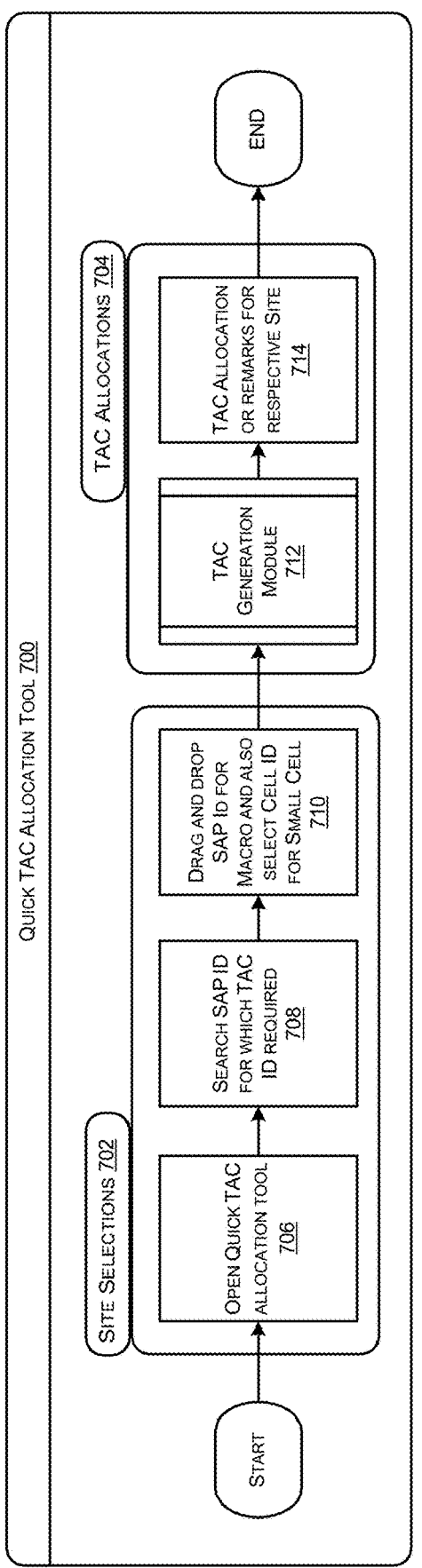
FIGS. 7-8 illustrates exemplary flow diagram of a quick TAC allocation tool (700) generation, in accordance with an embodiment of the present disclosure.
Figure 8:
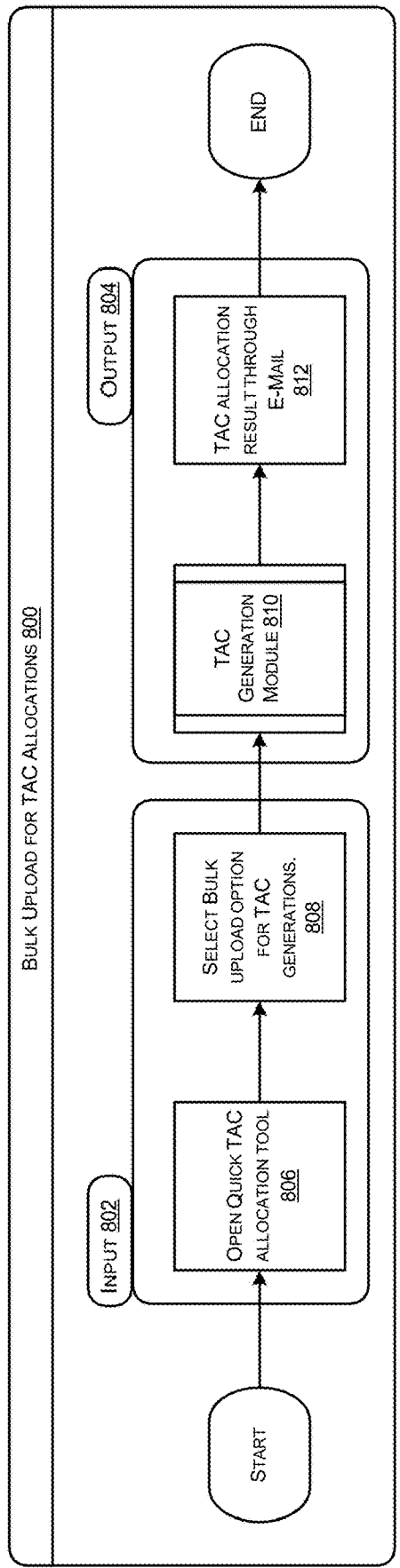

FIGS. 7-8 illustrates exemplary flow diagram of a quick TAC allocation tool (700) generation, in accordance with an embodiment of the present disclosure.

Figure 9:
FIG. 9 illustrates exemplary illustration of TAC allocation tool (900), in accordance with an embodiment of the present disclosure.

FIG. 7 illustrates detail process of quick TAC allocation tool (700) such as at 704 opening TAC allocation tool referred in FIG. 5, at 706 searching required SITE ID through smart search by fetching latitude/longitude from master database for respective SAP ID, at 708 dragging and dropping SITE ID for macro cell and also select Call ID for small cell for site allocations at block 702, and at block 704, the steps may include the step 710 of generating TAC engine and at step 712 sending TAC allocation result for respective sites through email. FIG. 8 illustrates detail process of bulk upload for TAC allocations (800) comprising of input (802) and output blocks (804) such as at 806 opening quick TAC allocation tool referred in FIG. 7, at 808 selecting bulk upload option for TAC generations, at 810 generating TAC engine and at 812 sending TAC allocation result for respective sites through email. With above steps user can generate TAC ID for at least 5 sites based on SITE IDor Lat/Long of sites via UI. In case user need to generate TAC Id for bulk sites (Less than 3000 but not limited to it), user can upload SAPID/Lat/Long in predefined csv template. System will perform all above steps for each site and generate report with TAC ID and shared through E-Mail to respective users. FIG. 9 illustrates exemplary illustration of TAC allocation tool (900), in accordance with an embodiment of the present disclosure.

Figure 10:
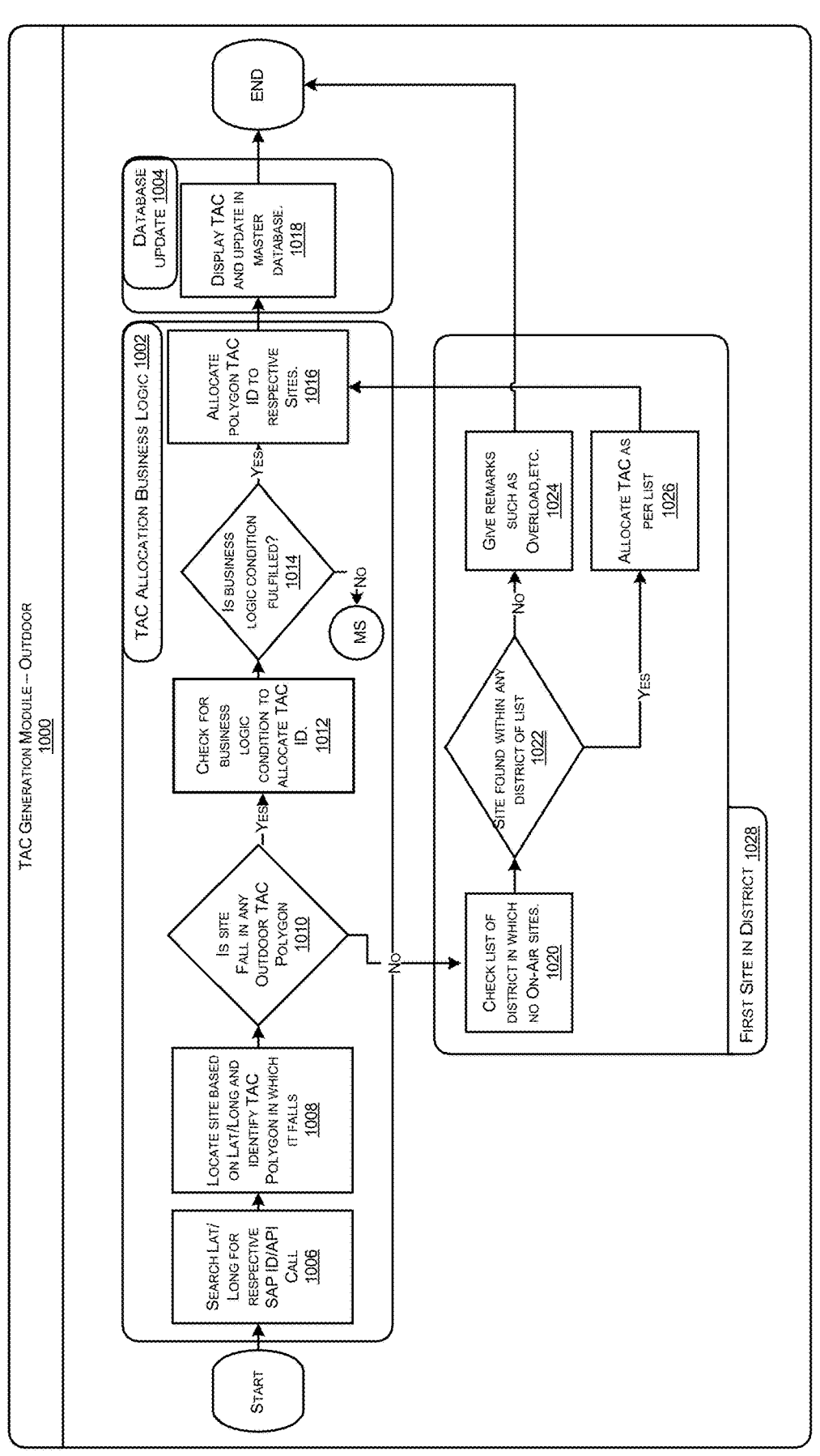
FIG. 10 illustrates exemplary flow diagram representation of TAC allocation through API (1000), in accordance with an embodiment of the present disclosure.

FIG. 10 illustrates exemplary flow diagram representation of TAC allocation through API (1000), in accordance with an embodiment of the present disclosure. Allocation of TAC ID to new sites can be done through manual allocation tool as explained in above or through API to other eNodeB growth engine. In API method (1000), the TAC allocation engine (1002) comprises the step 1006 of fetching SITE ID and Cell ID through API from another engine and identifying TAC polygon in which latitude/longitude of site falls. All steps explained in TAC ID Allocation through quick tool is executed by system to allocate TAC ID as a response to API. At step 1008, the method includes locating site-based latitude/longitude on and TAC identify polygon in which it falls, at step 1010 is site fall in any outdoor TAC polygon? May render a Yes, then at 1012 Check utilization and other parameters. At 1014 If certain parameter check is okay assigned TAC ID in which site falls, at 1016 allocate TAC polygon ID to respective sites and at block 1002 consisting of update database, the step 1018 may include display TAC and update master database. But if at step 1010 if site fall in any outdoor TAC polygon may render a No, then go to the block 1028 consisting the step 1020 of checking list of districts in which no On-air sites are available, then at step 1022 site found within any district list. If no, then at 1024 append remarks such as overload, etc and if yes, then at step 1026 allocate TAC as per list and thereby go to 1016 and 1018.

In an embodiment, when TAC utilization reaches to pre-defined threshold and auto TAC division and work order generation feature is enabled through admin control than auto TAC division engine get executed followed by work order generation and execution in respective systems.

Figure 11:
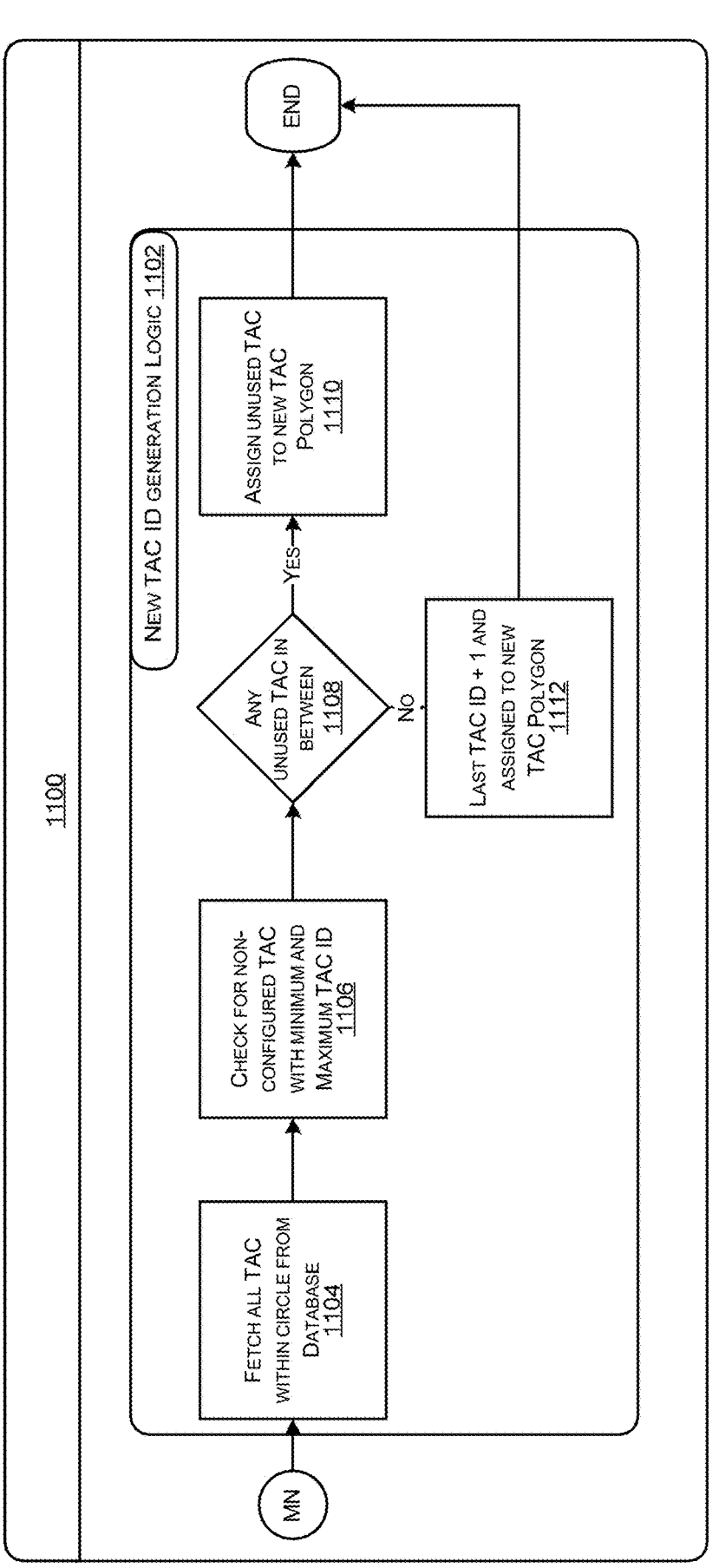
FIG. 11 illustrates exemplary flow diagram representation of an outdoor new TAC ID generation (1100), in accordance with an embodiment of the present disclosure.

FIG. 11 illustrates exemplary flow diagram representation of an outdoor new TAC ID generation (1100), in accordance with an embodiment of the present disclosure. The new TAC ID generation logic at block 1102 may include at 1104 fetching all TAC within circle from database, at step 1106 checking for non-configured TAC with minimum and maximum TAC ID. If there are any unused TAC in between at step 1108 then at step 1110 assign unused TAC to new TAC polygon. If there are no unused TAC in between at step 1108, then at step 1112, increment last TAC id with 1 and assign to New TAC polygon.

Figure 12:
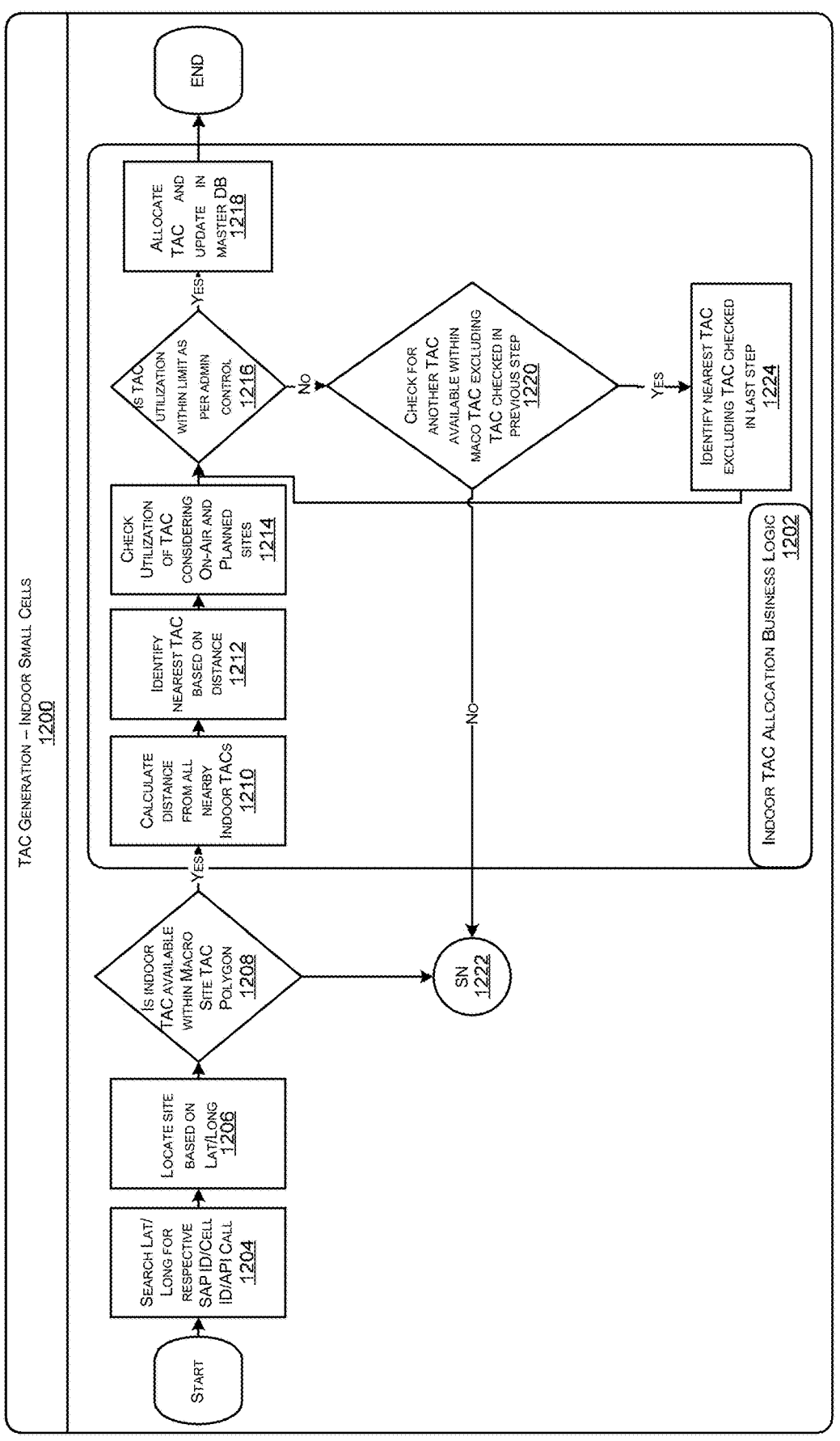
FIG. 12 illustrates exemplary flow diagram representation of an indoor new TAC ID generation (1200), in accordance with an embodiment of the present disclosure.

FIG. 12 illustrates exemplary flow diagram representation of an indoor new TAC ID generation (1200), in accordance with an embodiment of the present disclosure. As illustrated, the indoor new TAC ID generation (1200) comprises the steps 1204 of searching latitude/longitude of site falls and at 1206 locating site based latitude/longitude on which it falls, at step 1208 if indoor TA available for macro site TAC polygon, then at block 1202 comprising of indoor TAC allocation logic, the steps 1210 of calculating distance from all nearby indoor TACs, 1212 identifying nearest TAC based on distance, at 1214 check utilization of TAC on AIR and planned sites are performed. If at 1216 TAC utilization is within limit of new admin control then go to step 1218 of allocating TAC and updating in master database. If at 1216 TAC utilization is not within limit of new admin control then at 1220 checking for another TAC available within macro TAC excluding TAC checked in previous step and at 1222 identifying nearest TAC excluding TAC checked in last step may be performed.

Figure 13:
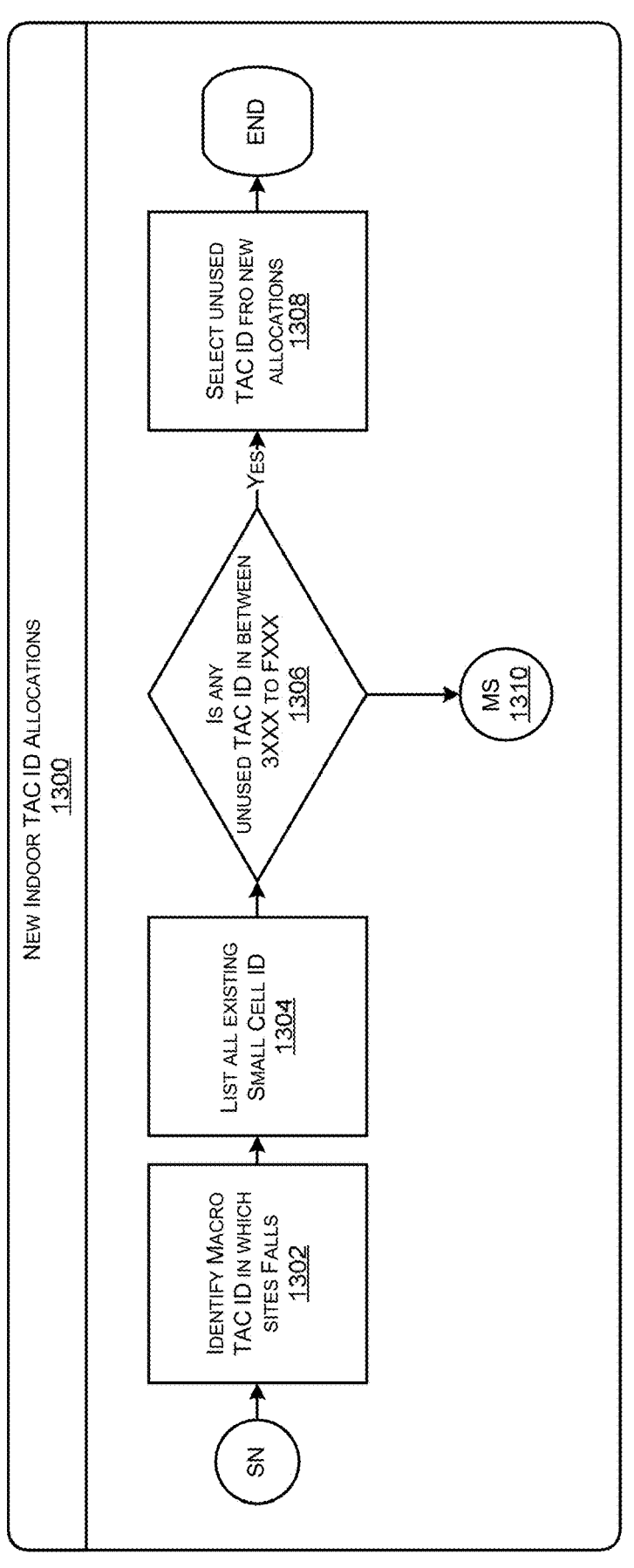
FIG. 13 illustrates exemplary flow diagram representation of an indoor new TAC ID allocation (1300), in accordance with an embodiment of the present disclosure.

FIG. 13 illustrates exemplary flow diagram representation of an indoor new TAC ID allocation (1300), in accordance with an embodiment of the present disclosure. As illustrated, the indoor new TAC ID allocation (1300), may include the steps 1302 of identifying macro TAC ID in which site falls, 1304 listing all existing small cell IDs. If at 1306, there is any unused TAC ID then at step 1308, select unused TAC ID for new allocations.

Figure 14:
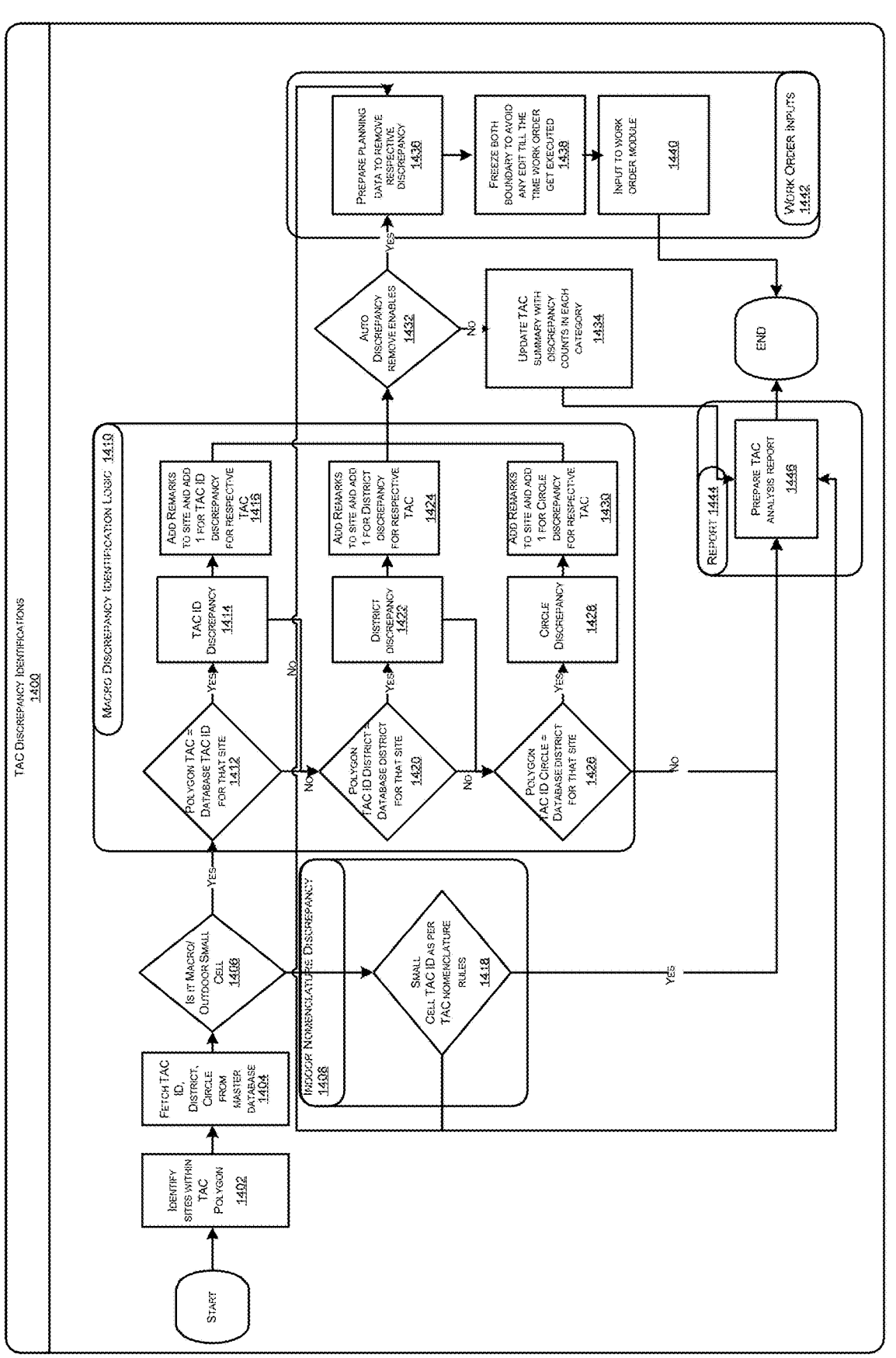
FIG. 14 illustrates exemplary flow diagram representation of a discrepancy identification (1400), in accordance with an embodiment of the present disclosure.

FIG. 14 illustrates exemplary flow diagram representation of an discrepancy identification (1400), in accordance with an embodiment of the present disclosure. As illustrated, the discrepancy identification (1400) comprises at 1402, the step of identifying sites within TAC polygon, at step 1404 of fetching TAC ID for each eNodeB from OSS (OSS) and then passed on to the macro discrepancy identification logic block (1410) and compared with TAC Polygon ID in which sites falls. In case eNodeB TAC ID is not matched with Polygon TAC ID than such case identified as TAC ID Discrepancy. As per logic TAC Polygon and site should belong to single district, in case any deviation detected, then such sites are identified as district boundary discrepancy at block (1408). To identify district discrepancy, TAC to district mapping and same may be done by tagging each eNodeB with district name based on location of eNodeB, identifying list of eNodeB within TAC Polygon, identify district name which appears maximum time in each TAC Polygon eNodeB list, mapping TAC Polygon ID to district name which device from above step and then sent to the work order input block (1442).

Figure 15:
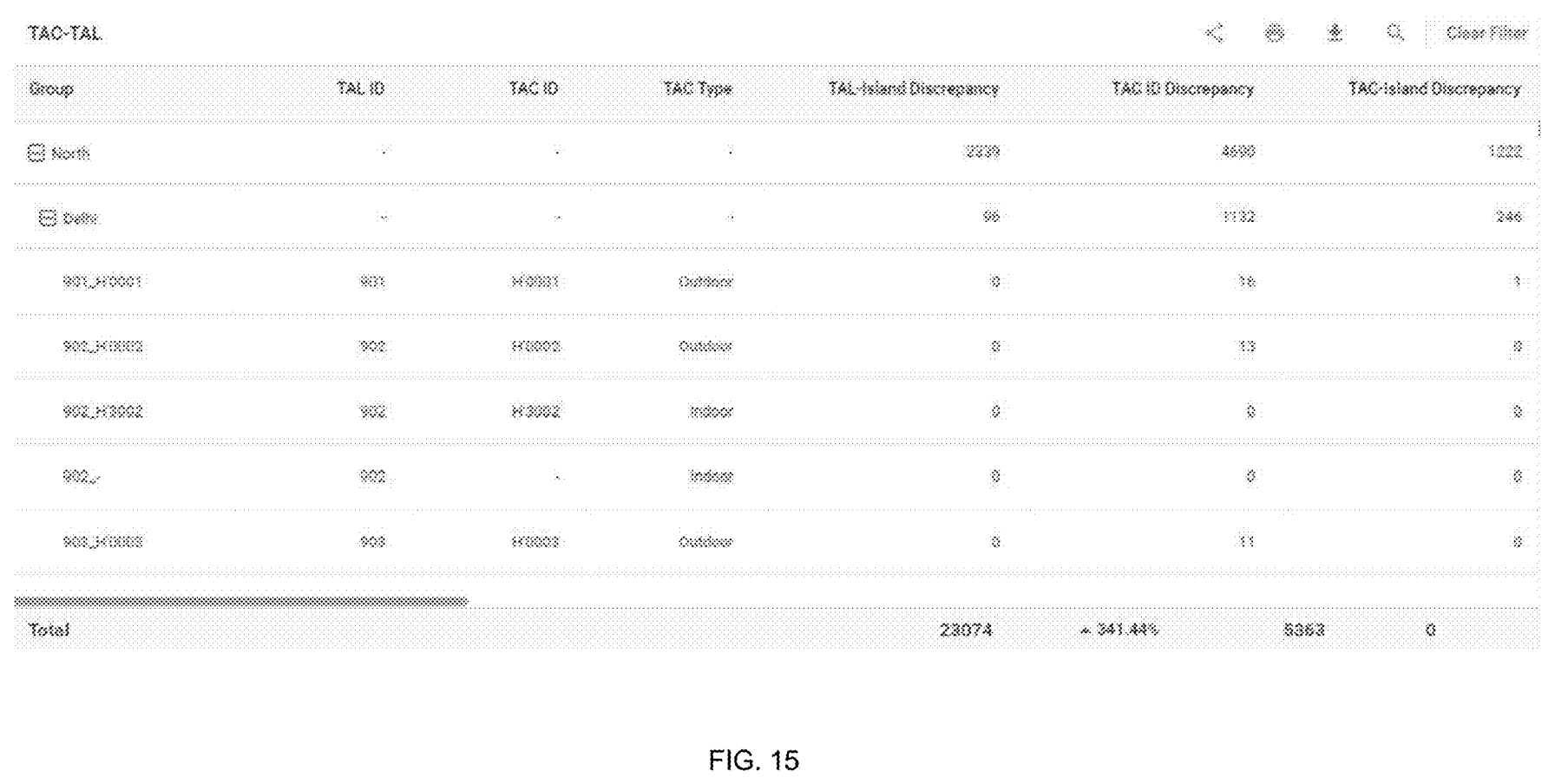

FIG. 15 illustrates exemplary flow diagram representation of TAC audit and report (1500), in accordance with an embodiment of the present disclosure. As illustrated, TAC ID wise, number of sites with various discrepancy, number of planned and On-Air sites along with utilization calculations and detail site list are available as report and can be explored through TAC audit sections. User can select individual eNodeB with TAC ID and district discrepancy through audit section to generate work order for resolutions. Work order for resolution can be triggered manual or automatically based on admin control settings.

Figure 16:
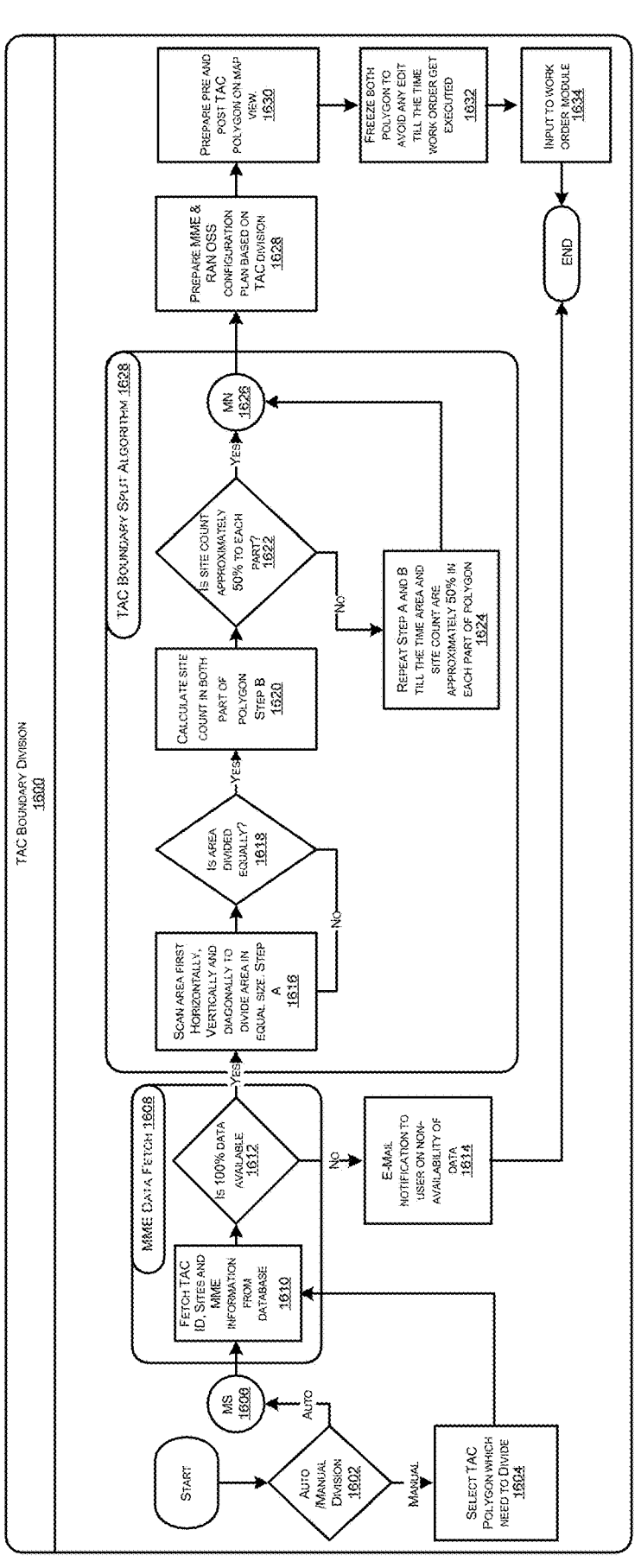
FIG. 16 illustrates exemplary flow diagram representation of TAC boundary division (1600), in accordance with an embodiment of the present disclosure.

FIG. 16 illustrates exemplary flow diagram representation of TAC boundary division (1600), in accordance with an embodiment of the present disclosure.

Figure 17:
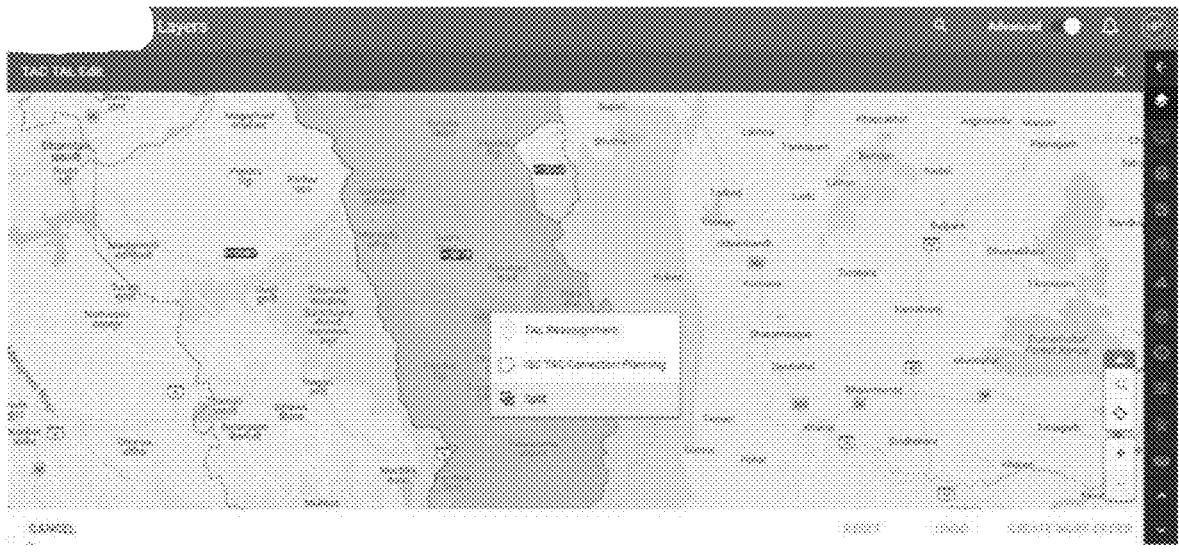
FIGS. 17-18 illustrate exemplary illustrations representing TAC boundary division (1700), in accordance with an embodiment of the present disclosure.
Figure 18:
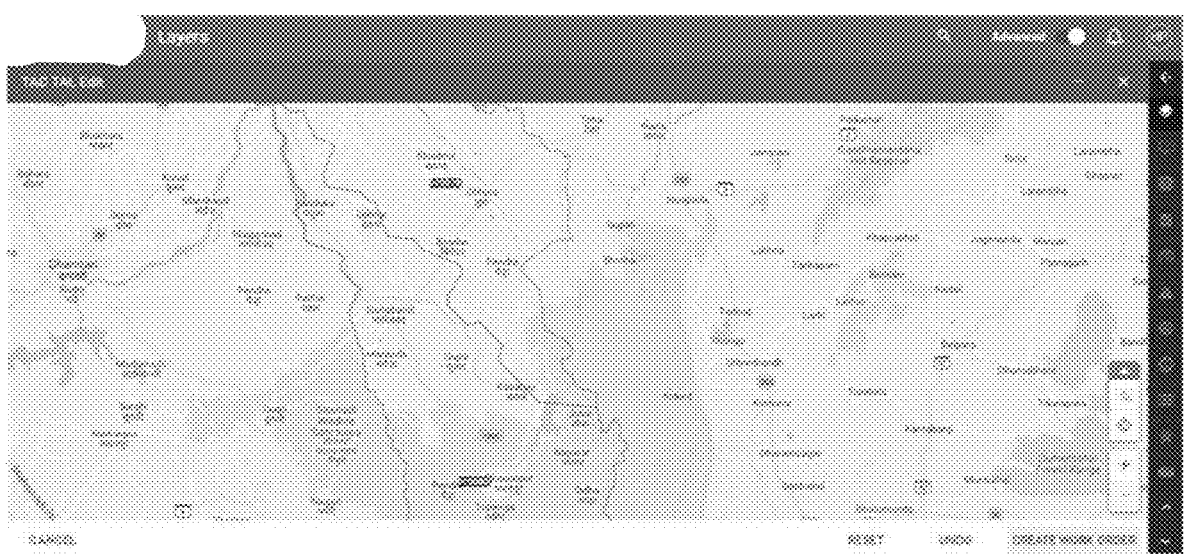

As illustrated, at 1602, auto or manual division and then at 1604 selecting TAC polygon which needs to be divided and then sent to MME data fetch block (1608) and is then sent to TAC boundary split block (1628) that further at 1629 prepares MME and RAN OSS configuration plan based on TAC division, at 1630 prepares pre and post TAC polygon map view, at 1632, freeze both polygon and then at 1634, input it to work order engine. If at 1612, 100% data is available, then auto E-Mail to respective Stockholders. Circle wise TAC summary (TAC ID, Site Counts, Discrepancy, TAC Polygon Island) and detail site level report being prepared every Monday and shared through E-Mail to respective stakeholders. The TAC boundary split block (1628) comprises the functions of TAC Division, Merge and Edit where TAC Polygon utilization calculated based on number of sites within TAC and total capacity of TAC. As and when TAC utilization thresholds cross defined in admin control TAC Polygon to be Divided in two part. One part will retain existing TAC ID and new defined Polygon to be assigned with new TAC ID. New TAC ID assigned based on unused TAC ID in system. TAC Polygon division has been done based on below logic comprising steps 1616, 1618, that includes scanning TAC Polygon geographical in vertical axis, horizontal axis and diagonal axis from both sides to derive 50-50% geographic area in both Polygon, and at 1620 calculating number of sites, at 1622 in case site count is also 50-50% than Divide Polygon 1618, in case delta in site count both steps 1624 get repeat till the polygon area and site count get divided 50-50% in both polygon. FIGS. 17-18 illustrate exemplary illustrations representing TAC boundary division (1700), in accordance with an embodiment of the present disclosure.

Figure 19:
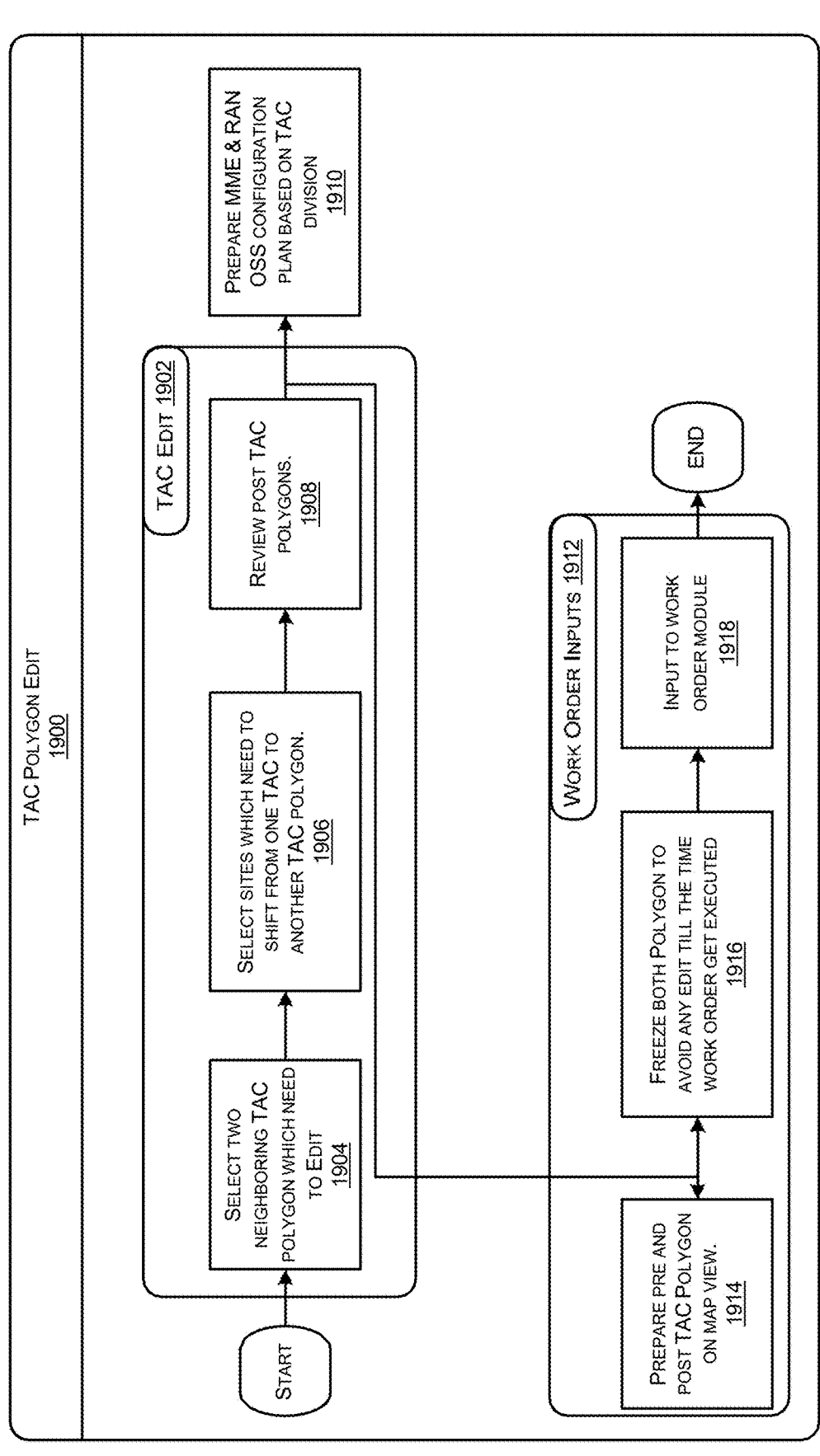
FIG. 19 illustrates an exemplary flow diagram representing TAC polygon edit (1900), in accordance with an embodiment of the present disclosure.
Figure 20:
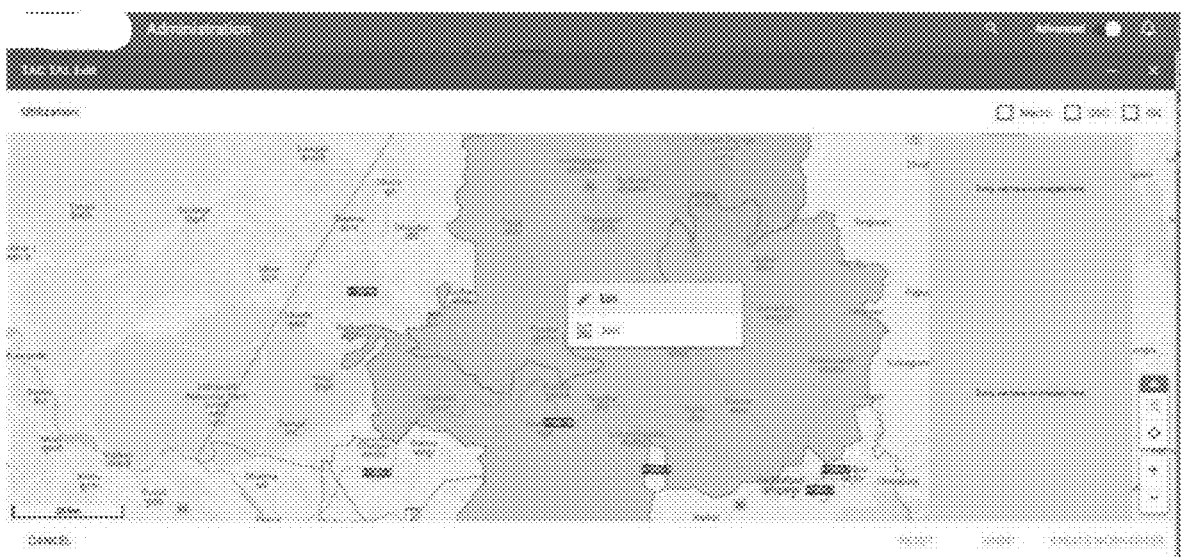
FIGS. 20-21 illustrate exemplary illustrations representing TAC polygon edits in accordance with an embodiment of the present disclosure.
Figure 21:
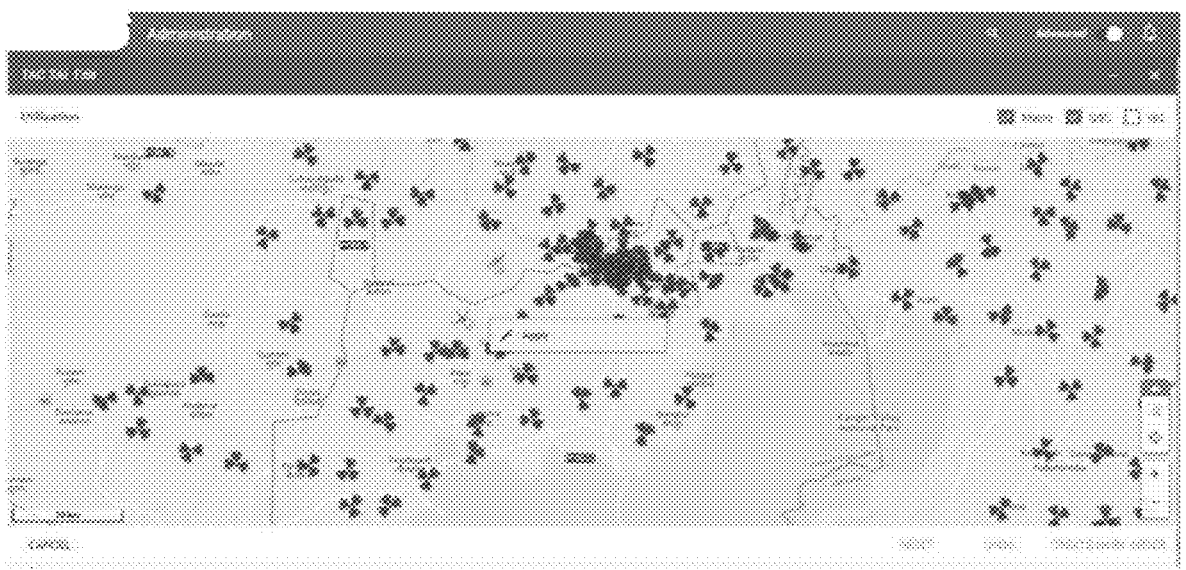

FIG. 19 illustrates exemplary illustrations representing TAC polygon edit (1900), in accordance with an embodiment of the present disclosure. FIGS. 20-21 illustrate exemplary illustrations representing TAC polygon edits in accordance with an embodiment of the present disclosure. In an embodiment, a TAC polygon edit engine within the TAC Controller is configured to: select at least a first TAC polygon and a second TAC polygon from the created TAC polygons for editing; select the site to be shifted from the first TAC polygon to the second TAC polygon; generate a work order to freeze the first and second TAC polygons with the site being shifted to be covered under the second TAC polygon; prepare the operating support system's configuration plan for shift from the first TAC polygon to the second TAC polygon.

In an embodiment, the method comprises polygon division based on utilization of polygon. The utilization can be calculated by a number of sites, paging success, other network KPI and is not limited to mentioning parameters. On over utilization, the polygon division engine can scan the entire polygon and divide it in two parts in such a way to have equal area and site division in each polygon. A work order is generated to freeze the both TAC polygons with the TAC ID of the newly created TAC polygon and the operating support system's configuration plan is prepared for shift from the old TAC polygon to the newly created TAC polygon.

In an embodiment, the TAC Polygon plays critical role in paging success hence TAC polygon needs to be planned carefully to avoid vertical intersections with highways, railways and other capacity hotspot. To avoid such complexity in TAC polygon planning, Polygon edit features may be a vital requirement. With help of TAC edit (1902) functionality user can modify polygon as and when required as illustrated in FIG. 19. A user can move sites from one polygon to other by selecting desired sites at step 1904. Post selection of sites, the method (1900) includes the step 1906 of selecting sites which need to be shifted from one TAC to another TAC polygon and at 1908 reviewing and confirmation post TAC polygon as per Voronoi polygon of each sites. Then at 1910 prepare MME and RAN OSS configuration plan based on TAC division, at 1914 prepares pre and post TAC polygon map view, at 1916, freeze both polygon and then at 1918, input it to work order engine.

Figure 22:
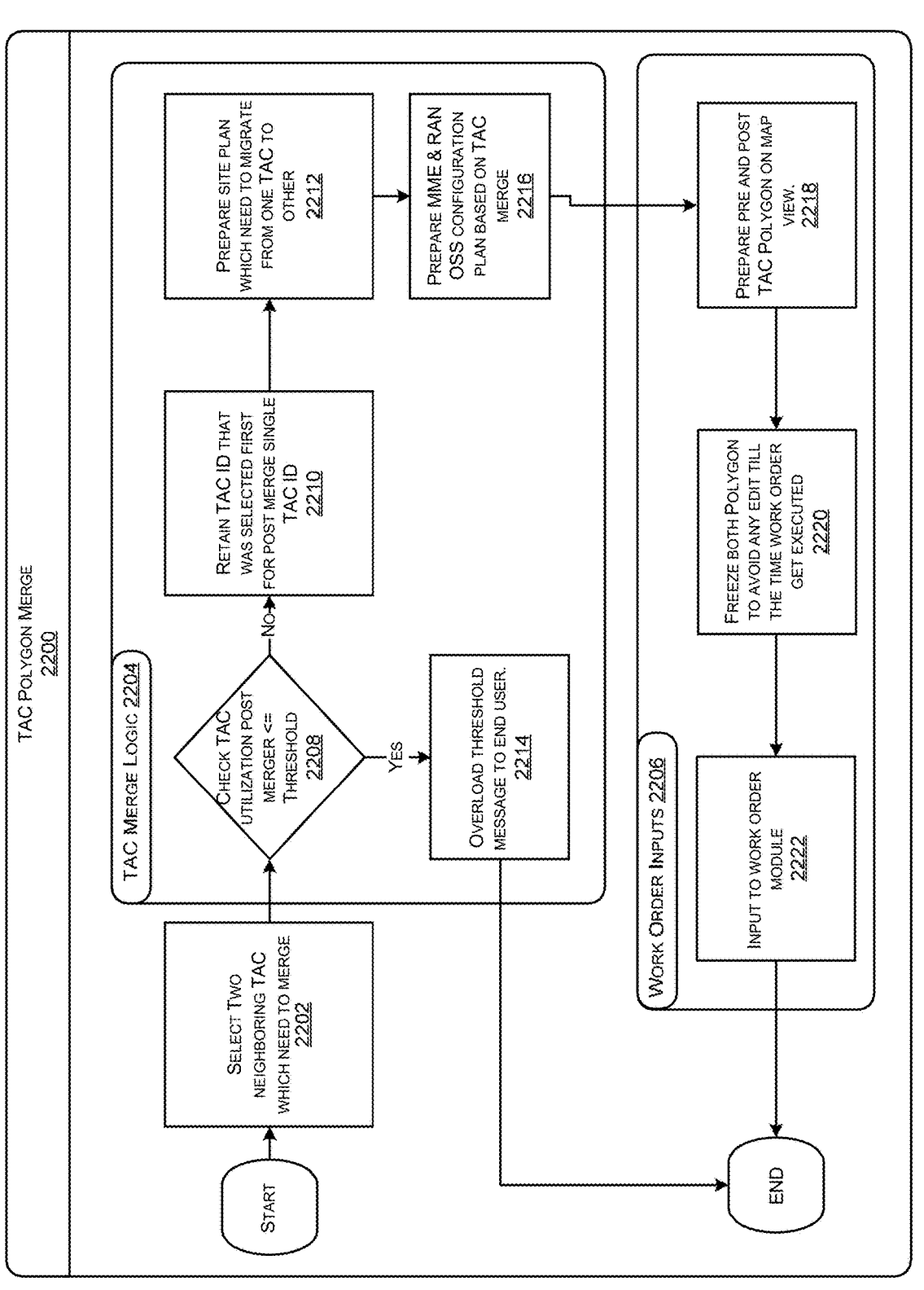
FIG. 22 illustrates an exemplary flow diagram representing TAC polygon merge (2200), in accordance with an embodiment of the present disclosure.

FIG. 22 illustrates exemplary illustrations representing TAC polygon merge (2200), in accordance with an embodiment of the present disclosure.

Figure 23:
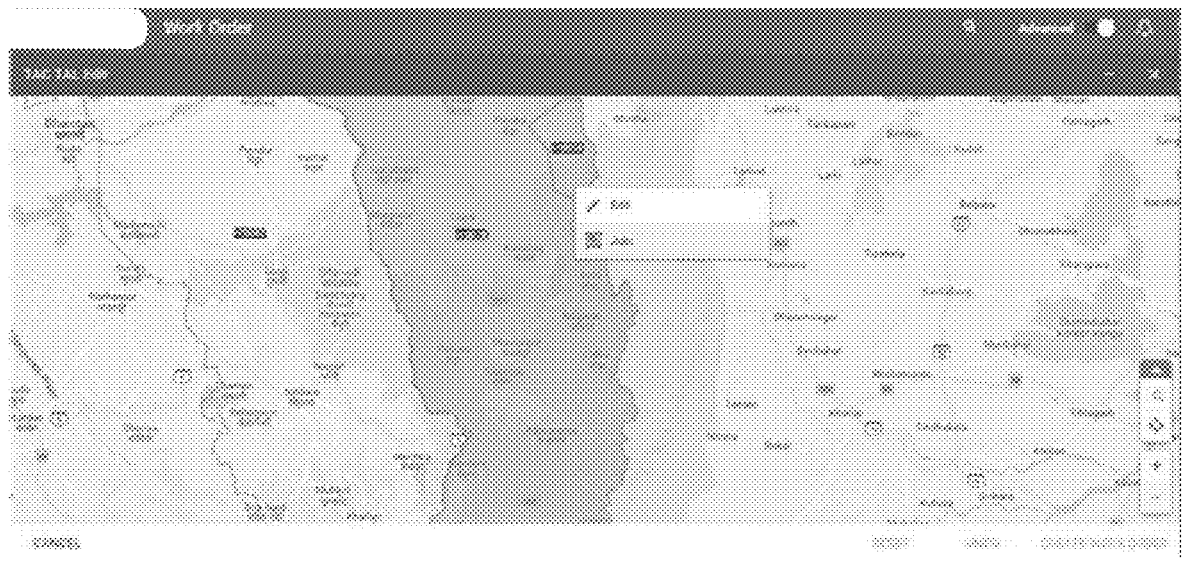
FIGS. 23-24 illustrate exemplary illustrations representing TAC polygon merge in accordance with an embodiment of the present disclosure.
Figure 24:
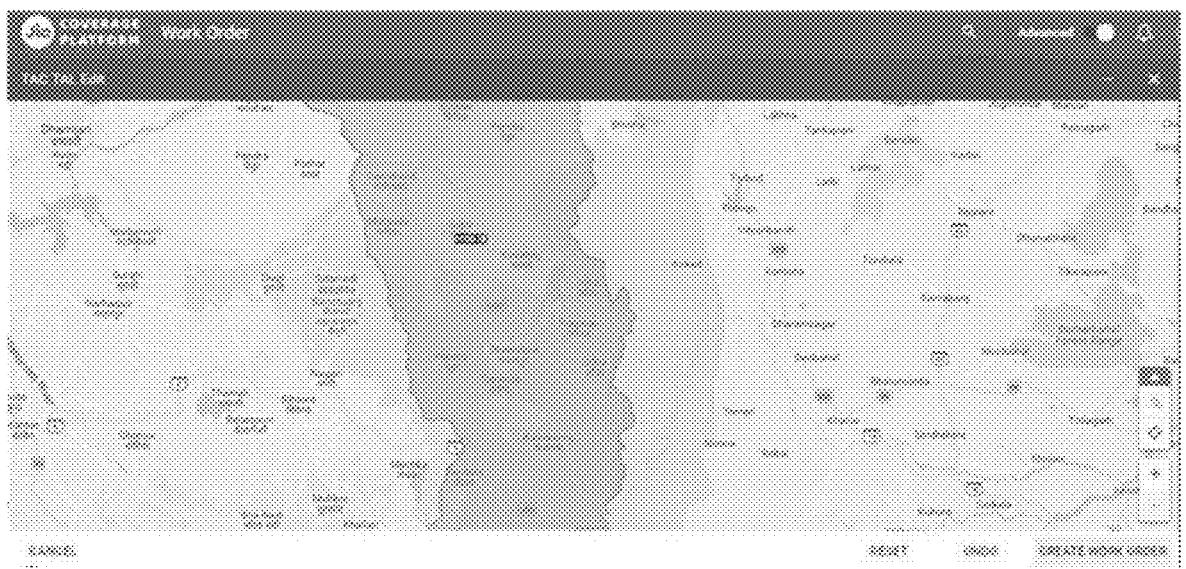

FIGS. 23-24 illustrate exemplary illustrations representing TAC polygon merge in accordance with an embodiment of the present disclosure. During planning phase due to human error or in case of rehoming of any sites is down than it creates wrong configuration of site. Such error creates multiple polygons or small island in any other TAC polygon. TAC merger feature is designed to correct such kind of error and merge two or more TAC polygons. The user can select polygon/island through geographical interface at 2202 and generate work order at 2206. Based on TAC division, edit and merge work order is being generated—manual or automatic as per system definitions at block 2204.

Figure 25:
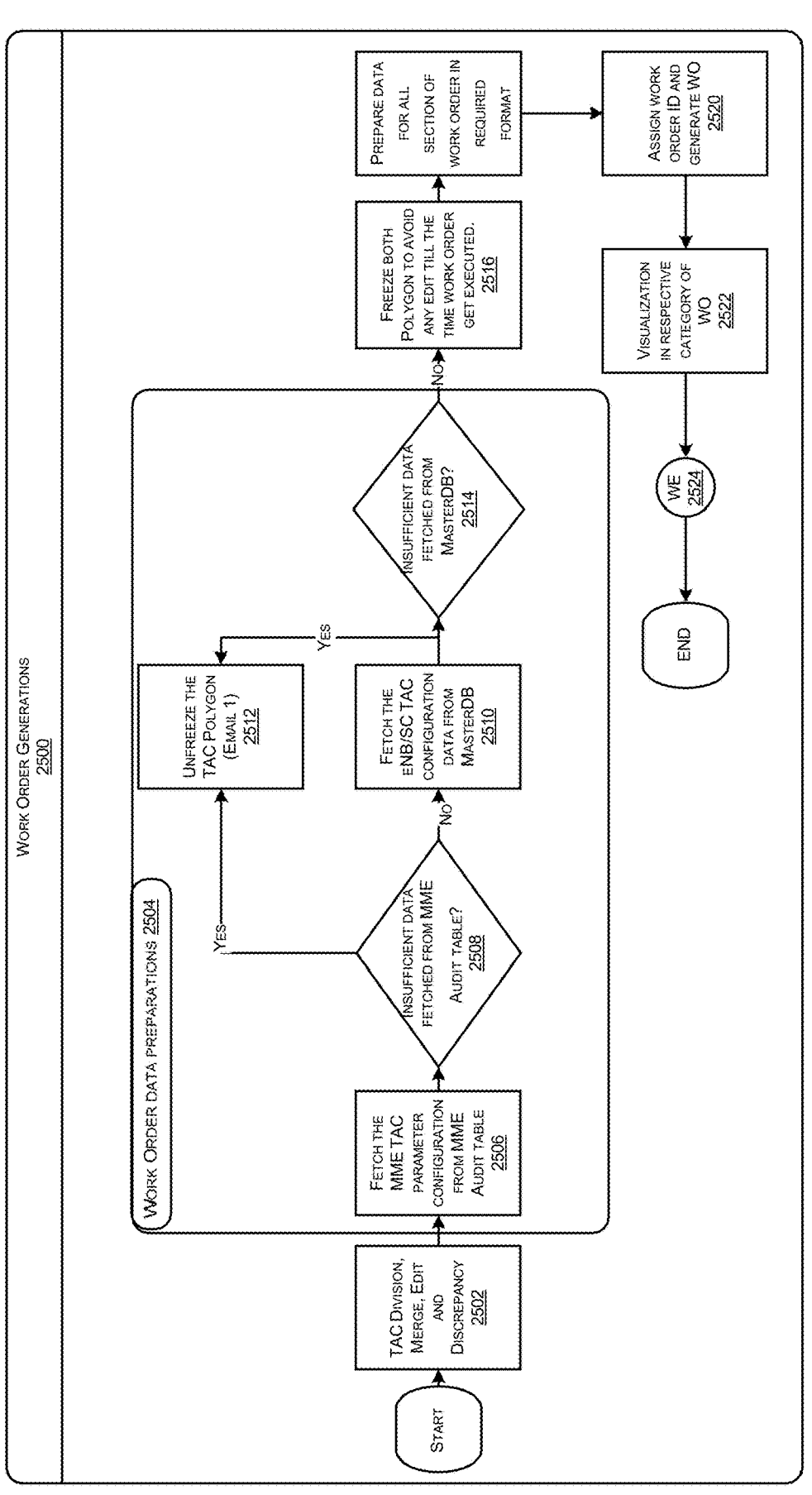
FIG. 25 illustrates an exemplary flow diagram representing Work order generation (2500), in accordance with an embodiment of the present disclosure.
Figure 26:
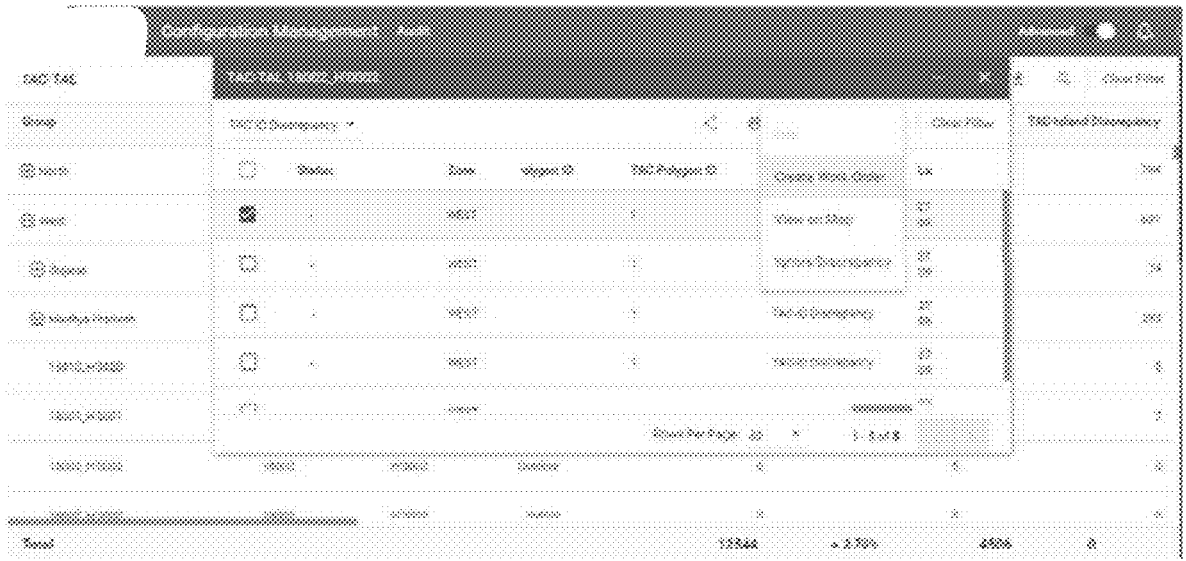
FIGS. 26-29 illustrate exemplary illustrations representing Work order generations in accordance with an embodiment of the present disclosure.
Figure 27:
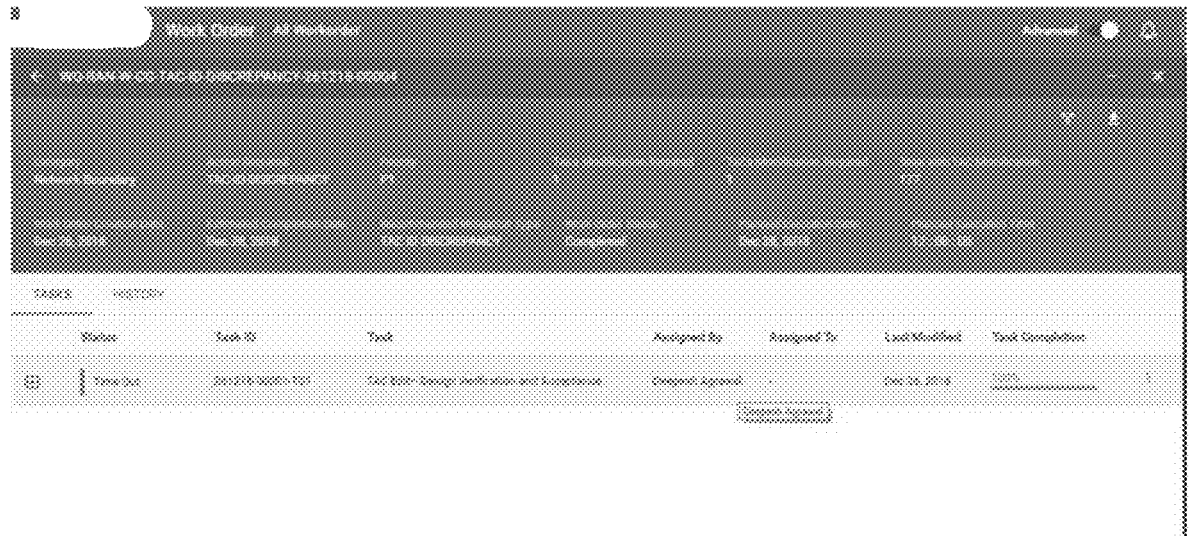
Figure 28:
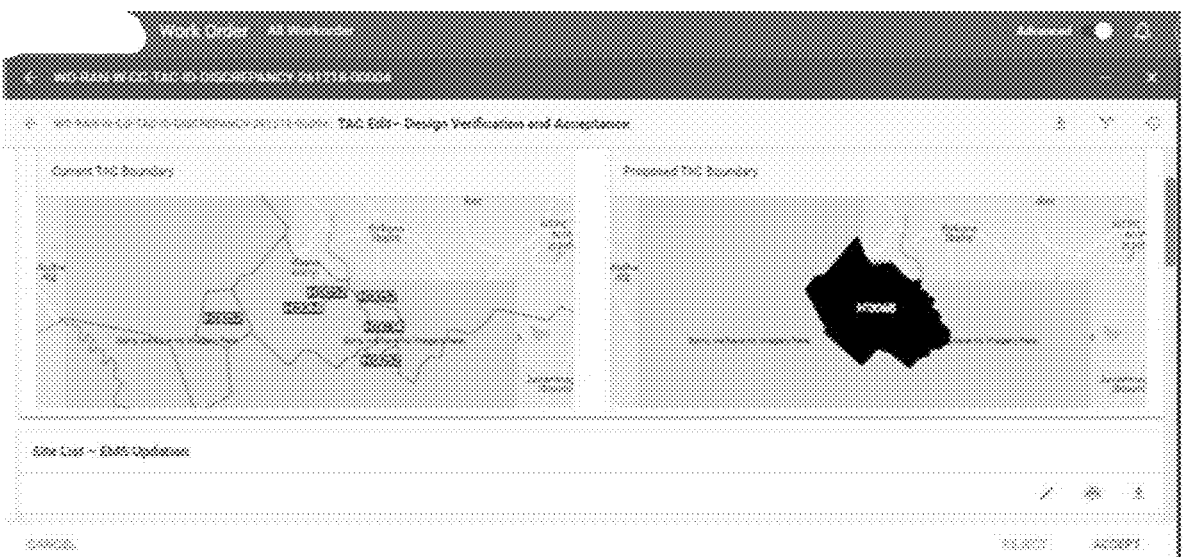
Figure 29:
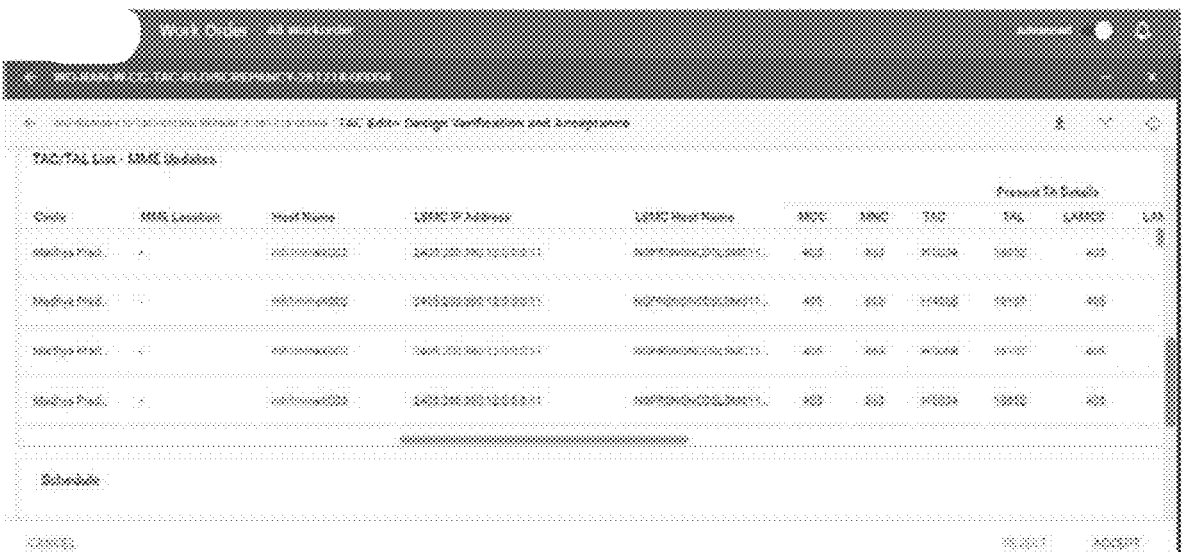

FIG. 25 illustrates exemplary illustrations representing Work order generation (2500), in accordance with an embodiment of the present disclosure. Various work order such as TAC Division, Merge, Edit, Discrepancy removal (2502) can be generated through UI interface as well as auto generation as per system settings, then at block 2504, work order data preparation may be done which are then freezed at 2516, prepared at 2518, assigned at 2520 and visualized at 2522 for TAC division, removal of island and discrepancy and can be set for auto generation through admin control through user interface (UI) interface user can review and take action on various work orders. FIGS. 26-29 illustrates Manual TAC work order creation for discrepancy, work order summary, work order detail view and work order detail site level planning respectively. FIGS. 26-29 illustrate exemplary illustrations representing Work order generations in accordance with an embodiment of the present disclosure.

Figure 30:
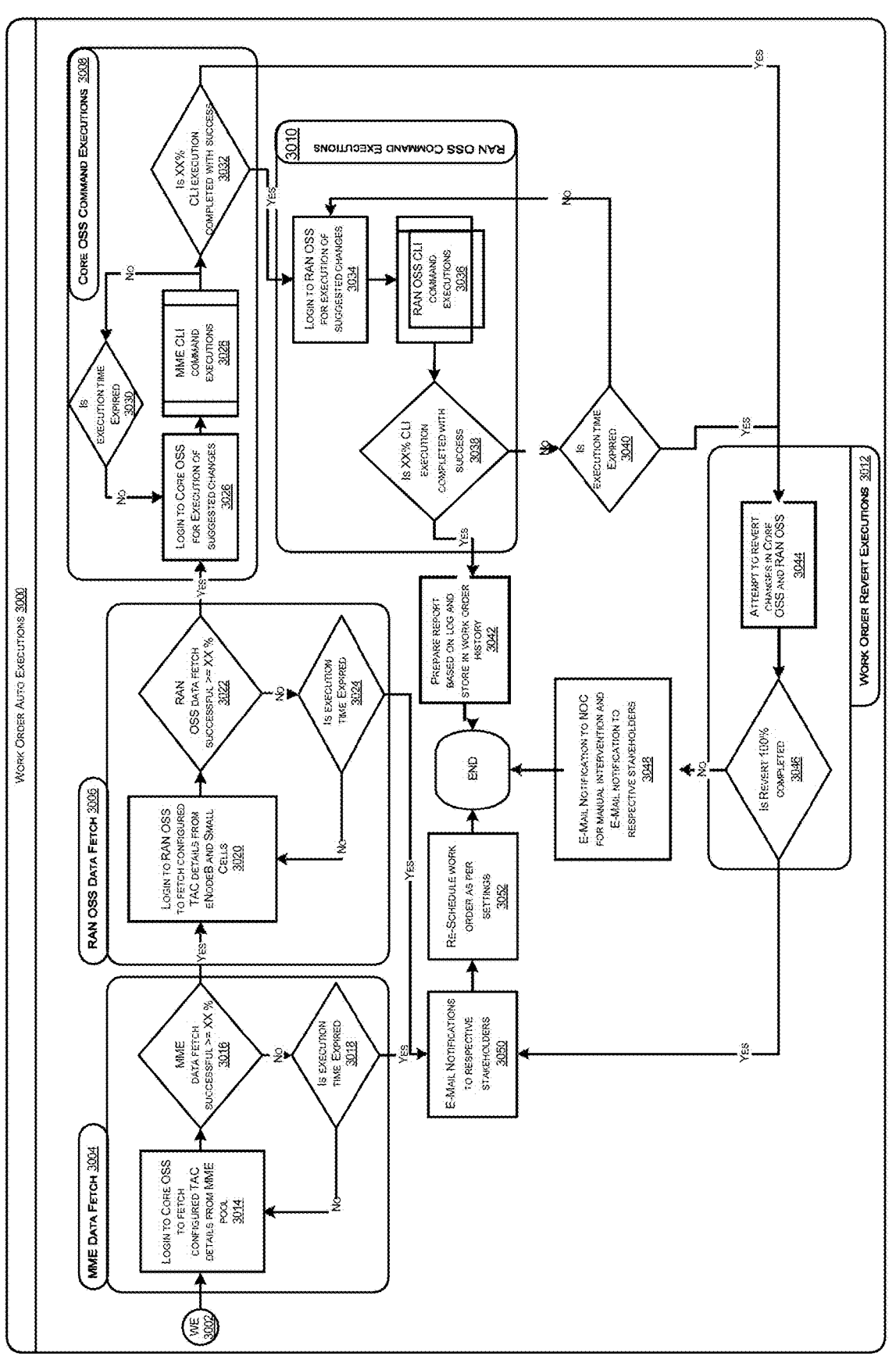
FIG. 30 illustrates an exemplary flow diagram representing Work order execution (3000), in accordance with an embodiment of the present disclosure.

FIG. 30 illustrates exemplary illustrations representing Work order execution (3000), in accordance with an embodiment of the present disclosure. As explained above in various sections, based on certain parameter and requirement, work order is being generated for various tasks through MME data fetch (3004), RAN data OSS fetch (3006). Work order contains executive summary of changes being performed through respective work order and volumetric information's. In planning section of work order, list of sites/eNodeB, MME, OSS and Small Cell OSS along with pre and post configuration details are provided for auto execution in respective systems. Through micro service and planning data base, pre-identified command such as read, and write commands are being executed by system. The step by step command executions may be performed by core OSS command executions (3008) and RAN OSS command executions (3010). The steps include first execution done in MME through CORE OSS, retrieving existing configuration form system, comparing existing configuration with work order planned data. in case of difference system will perform comparing existing configuration with work order planned data and beyond, in case no difference system will not perform any action. Through write command, the method further may include implementing configurations as per planning data and post completion of the above steps, retrieving data for confirmations. In case of failure, the system will attempt till the time execution window defined, in case no success within execution window than execution will be abort and rescheduled on next available slot of executions. In order to proceed execution to other system either OSS Small Cell OSS Radio OSS execution in CORE OSS should be completed 100% OSS Small Cell OSS Radio OSS Post execution of execution in MME pool, i.e., 100%, then JCP will execute the TAC changes in eNB/SC's, i.e., in OSS and Small Cell OSS respectively only for those nodes whose TAC changes are being planned. The JCP will verify the changes that have been done and will also verify the threshold site count for successfully execution set via the admin panel. In case of successful execution as per the admin settings, the JCP will close the work order and in case of unsuccessful, it will retry till XX hours as per the admin settings. If the retry execution is successful, JCP will close the work order or else JCP will revert the execution starting with eNB/SCs and then in MME Pool. If all the changes that needs to be reverted are successful, then JCP will reschedule the work order and if the revert option is unsuccessful within stipulated time, then JCP will escalate to NOC team via email communication.

Figure 31:
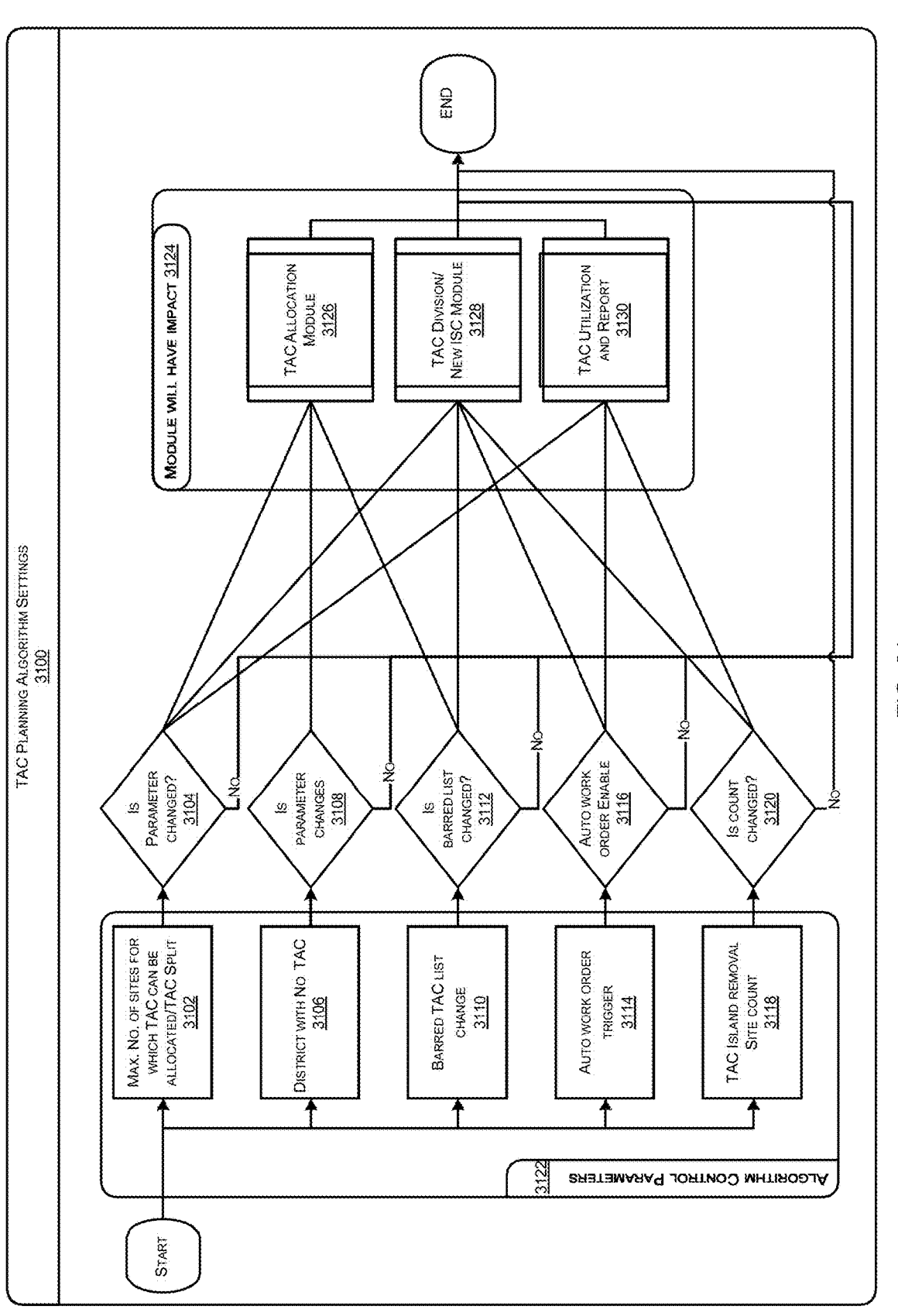
FIG. 31 illustrates an exemplary flow diagram representing TAC planning (3100), in accordance with an embodiment of the present disclosure.

FIG. 31 illustrates exemplary illustrations representing TAC planning (3100), in accordance with an embodiment of the present disclosure.

The TAC planning algorithm (3100) may include the following blocks as illustrated, first algorithm control parameter (3122-1)-Maximum number of sites for which TAC can be allocated/TAC split at 31102, if parameter changed at 3104 then simultaneously go to TAC allocation engine at 3126, TAC division/new ISC engine at 3128 and TAC utilization report 3130 at engine having impact block (3124). If parameter is not changed at 3104 then end processing. Second algorithm control parameter (3122-2)-district with no TAC at 3106, if parameter changed at 3108 then simultaneously go to TAC allocation engine at 3126, TAC division/new ISC engine at 3128 and TAC utilization report 3130 at engine having impact block (3124). If parameter is not changed at 3108 then end processing. Third algorithm control parameter (3122-3)-Barred TAC list change at 310, if barred list changed at 3112 then simultaneously go to TAC allocation engine at 3126, TAC division/new ISC engine at 3128 and TAC utilization report 3130 at engine having impact block (3124). If barred list is not changed at 3112 then end processing. Fourth algorithm control parameter (3122-4)—auto work order trigger at 3114, if auto work order is enabled at 3116 then simultaneously go to TAC allocation engine at 3126, TAC division/new ISC engine at 3128 and TAC utilization report 3130 at engine having impact block (3124). If auto work order is not enabled at 3116 then end processing. Fifth algorithm control parameter (3122-5)-TAC island removal site count at 3118, if count changed at 3120 then simultaneously go to TAC allocation engine at 3126, TAC division/new ISC engine at 3128 and TAC utilization report 3130 at engine having impact block (3124). If count is not changed at 3120 then end processing.

Figure 32:
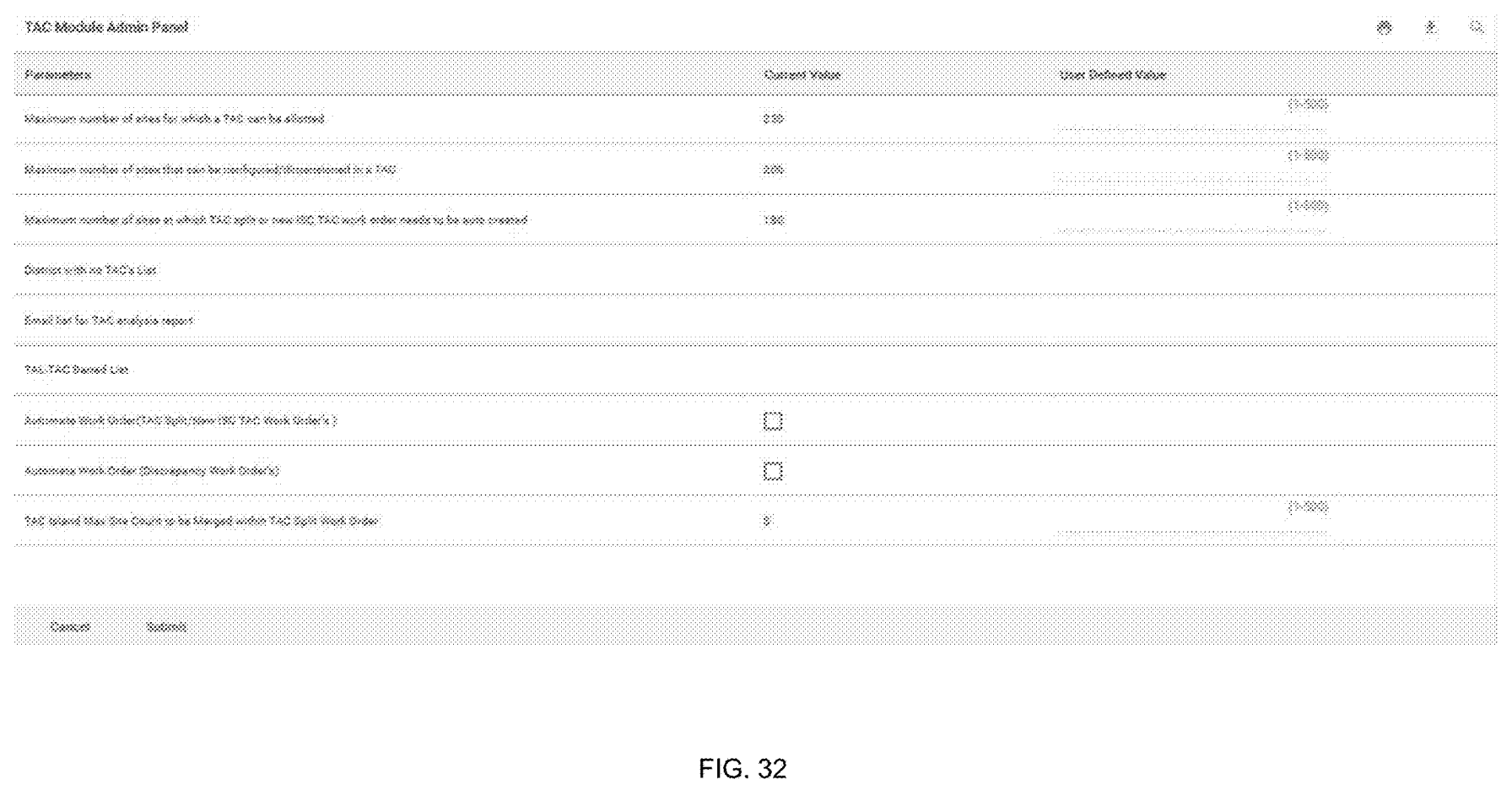
Figure 33:
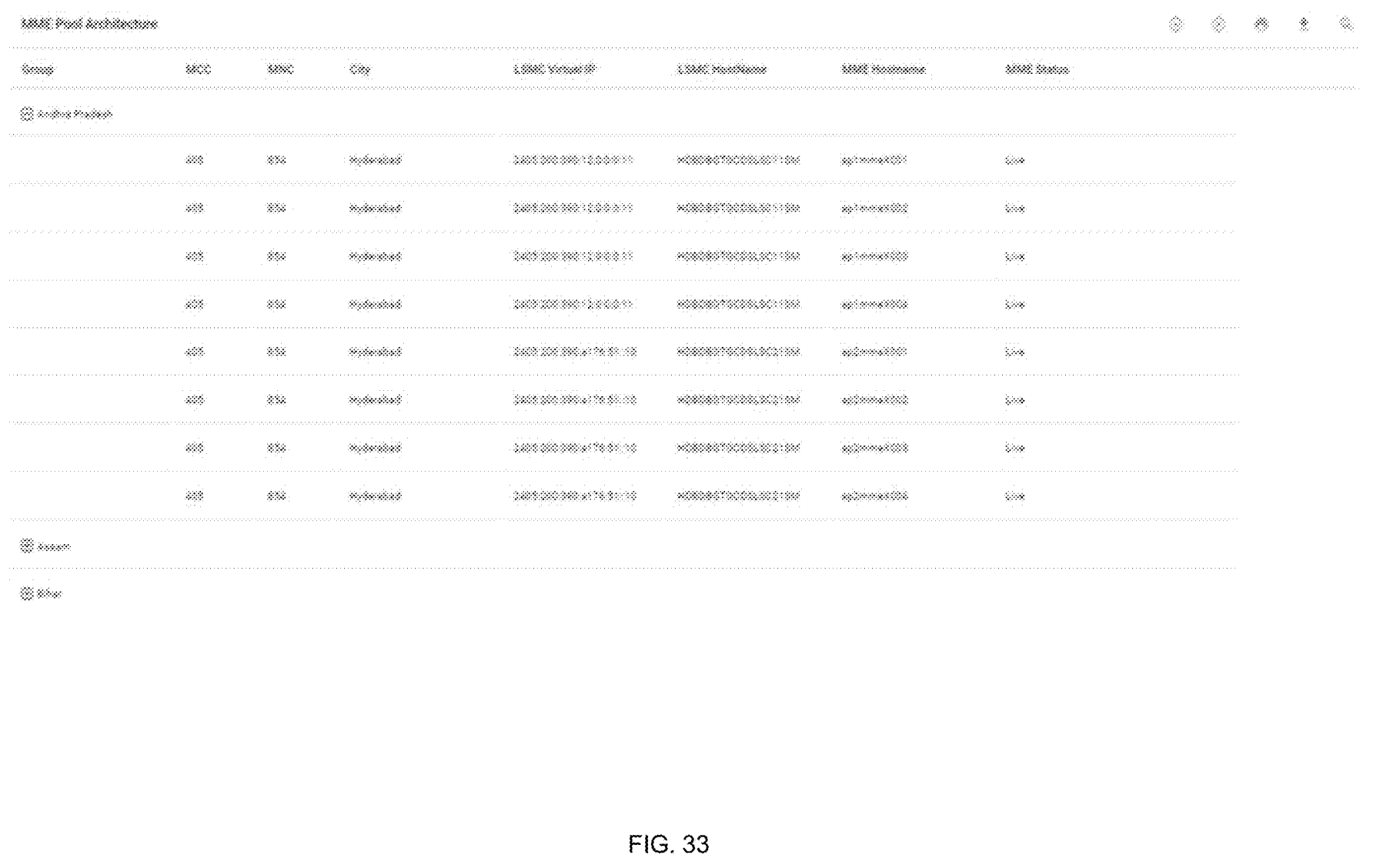

FIGS. 32-33 illustrate exemplary illustrations representing TAC settings in accordance with an embodiment of the present disclosure. As illustrated, FIG. 32 shows TAC Algorithm Settings user interface. The algorithm control parameters may include the following: A user can set the site count threshold for TAC planning, the user can set the site count threshold for TAC work order generation, the user can set the Island site count threshold for TAC Island Work Order consideration, the user can upload the District with no TAC's list so as to plan the same if a new site comes in, the user can upload the email list for TAC Analysis Report mailer, and the user can automate the TAC work orders as per the admin settings.

FIG. 33 shows MME Pool Admin Control UI and may include mapping of MME hostnames to a particular circle and hence, a user can map the MME hostname accordingly. The user can also remove the MME hostname in case of any MME pool architectural changes. Also, the user can add a circle in a pool as per the MME pool architectural planning. The user can also edit the MME hostname, as "Live" or "Non-Live" meaning if the MME hostname is new and is under testing, the same can be kept as "non-Live" till it is ready to take traffic. TAC work orders will be created as per the MME pool architectural planning for all the "Live" MME hostnames.

Advantages of the present disclosure may include a centralized Data base—All TAC polygons and actual configured details of TAC are available centrally. Centralized data base helps to increase accuracy of data and dependency on multiple teams/departments. Dynamic polygon—With the help of actual configuration and algorithm based daily polygon creation help to get latest polygon everyday which was not possible in manual planning mode. Accurate new site TAC planning—With help of latest polygon and certain parameter TAC assignment to new sites are 100% accurate. Accurate network planning helps to increase network performance and customer experience. Single Click TAC reports—TAC level utilizations, site count, multiple island and discrepancy report on single click for various administrative boundaries. Zero Touch Operation—Auto TAC allocation polygon division, New TAC generation and allocation, Site level TAC Planning and auto configuration in CORE OSS, OSS and Small Cell OSS makes TAC planning activity as fully automated zero touch engine.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

We claim:

1. A system for creating dynamic Tracking Area Code (TAC) polygons in a network in a given geographical area, the system comprising:

a processor (202);

a memory (204) coupled to the processor (202), wherein the memory (204) comprises processor-executable instructions, which on execution causes the processor (202) to:

receive, from one or more network nodes, a set of data packets, each of the said set of data packets corresponding to a TAC;

distribute the received set of data packets to a plurality of on-AIR sites within the network;

fetch, by a data acquisition engine, a configuration data of the one or more network nodes by retrieving a configuration management (CM) file from the one or more network nodes;

parse, from the CM file, a TAC ID for each of the one or more network nodes and store the TAC ID in a master database;

create, by a TAC Controller, on execution of a first set of executable instructions, a TAC polygon based on the configuration data extracted from the CM file; wherein the TAC Controller is further configured to:

fetch from the master database on an operational support system (OSS), a district boundary and a circle boundary;

clip, the created TAC polygon at the district boundary and the circle boundary;

display the clipped TAC polygons on a display by superimposing the TAC polygons on a map; and generate a report of the TAC polygons by a report generating engine.

2. The system for creating dynamic Tracking Area Code (TAC) polygons as claimed in claim 1, wherein the first set of executable instructions are a Voronoi algorithm.

3. The system for creating dynamic Tracking Area Code (TAC) polygons as claimed in claim 1, wherein the TAC Controller is further configured to:

identify a site within the TAC polygon and obtain the TAC ID for the site;

fetch from the master database, the TAC ID, the district boundary and the circle boundary associated with the site;

compare the TAC ID obtained from the master database with the TAC ID of the polygon within which the site falls;

on mismatch between the TAC ID obtained from the master database and the TAC ID of the polygon within which the site falls, determine a discrepancy in the TAC polygons.

4. The system as claimed in claim 1, wherein a TAC polygon edit engine within the TAC Controller is configured to:

select at least a first TAC polygon and a second TAC polygon from the created TAC polygons for editing;

select the site to be shifted from the first TAC polygon to the second TAC polygon;

generate a work order to freeze the first and second TAC polygons with the site being shifted to be covered under the second TAC polygon;

prepare the operating support system's configuration plan for shift from the first TAC polygon to the second TAC polygon.

5. The system as claimed in claim 4, wherein the TAC polygon edit engine is further configured to:

select at least a third TAC polygon and a fourth TAC polygon to be merged;

check by a TAC merge logic engine a utilization of the TAC post-merger;

on receipt of an overload threshold indication on checking, send an overload threshold message to a user;

on the utilization value being below threshold on checking, retain the TAC ID corresponding to the third TAC polygon for post merge single TAC ID;

prepare by the TAC merge logic engine a MME and RAN OSS configuration based on the merge;

generate a work order to freeze the third and fourth TAC polygons with the TAC ID of the third TAC polygon;

prepare the operating support system's configuration plan for shift from the first TAC polygon to the second TAC polygon.

6. A method for creating a dynamic Tracking Area Code polygon in a network, the method comprising:

receiving, from one or more network nodes, a set of data packets, each of the said set of data packets corresponding to a TAC;

distributing the received set of data packets to a plurality of on-AIR sites within the network;

fetching, by a data acquisition engine, a configuration of the one or more network nodes by retrieving a configuration management (CM) file from the one or more network nodes;

parsing, from the CM file, a TAC ID for each of the one or more network nodes and storing the TAC ID in a master database;

creating, by a TAC Controller, on executing a Voronoi algorithm, a TAC polygon based on the configuration data extracted from the CM file;

clustering the network nodes through machine learning clustering based on common TAC ID within each telecom circle comprising outdoor plotting of one or more network nodes and individual cells;

fetching a district boundary and a circle boundary from respective boundary engine; and clipping the TAC polygon at the district boundary and the circle boundary.

7. The method as claimed in claim 6, wherein the method further comprises:

searching a latitude/longitude for a SITE ID on receiving a TAC polygon to identify a site;

locating the site based on searched latitude/longitude;

identifying the created TAC polygon associated with the located site;

checking, by the TAC allocation business logic block for a business logic condition to allocate the TAC ID to the site;

allocating polygon TAC ID to the site on fulfilment of the business logic condition;

updating the polygon TAC ID assigned to the site on the master database by a database update engine;

sending a TAC allocation result for the site through a message.

8. The method as claimed in claim 6, wherein the method, when implemented by a TAC allocation tool includes:

searching a SITE ID by fetching a latitude/longitude from the master database for respective SAP ID;

dragging and dropping the SITE ID for macro cell and selecting Call ID for individual cell for site allocations;

generating a TAC engine;

sending a TAC allocation result for respective sites through a message.

9. The method as claimed in claim 6, wherein a indoor new TAC ID generation comprises:

searching a latitude/longitude of the site and locating latitude/longitude on which the site falls;

on an indoor Transfer Area being available for TAC ID, calculating distance from all nearby indoor TACs;

identifying the nearest TAC based on a distance from the site;

checking a utilization of the TAC on-AIR and on utilization being within limit, allocating TAC and updating the allocation data in the master database;

on utilization not being within limit, checking for another TAC available within excluding the TAC checked earlier to identify the nearest TAC excluding the TAC checked earlier.

10. The method as claimed in claim 6, wherein the method further comprises:

identifying the site within the TAC polygon and obtaining the TAC ID for the site;

fetching the TAC ID, the district boundary and the circle boundary associated with the site from the master database;

comparing the TAC ID obtained from the master database with the TAC ID of the polygon within which the site falls;

on mismatch between the TAC ID obtained from the master database and the TAC ID of the polygon within which the site falls, determining a discrepancy in the TAC polygons.

11. The method as claimed in claim 6, wherein the method further comprises editing the created TAC polygon by:

selecting at least a first TAC polygon and a second TAC polygon from the created TAC polygons for editing;

selecting the site to be shifted from the first TAC polygon to the second TAC polygon;

generating a work order to freeze the first and second TAC polygons with the site being shifted to be covered under the second TAC polygon;

preparing the operating support system's configuration plan for shift from the first TAC polygon to the second TAC polygon.

12. The method as claimed in claim 6, wherein the method further comprises polygon division based on a utilization of the polygon, by a polygon division engine comprised by:

calculating, based on a number of sites, a paging success, other network KPI the utilization of the generated TAC polygon;

on identification of over utilization, scanning, by the polygon division engine the entire TAC polygon; and dividing said TAC polygon into two parts such that the resulting TAC polygons after dividing have an equal area and site division in each polygon;

generating a work order to freeze the generated TAC polygons with the TAC ID of the newly created TAC polygon;

preparing the operating support system's configuration plan for shift from the previous TAC polygon to the newly created TAC polygon.

\* \* \* \* \*